(12) United States Patent
Dou et al.

(10) Patent No.: US 12,079,691 B2
(45) Date of Patent: Sep. 3, 2024

(54) QUANTUM CONVOLUTION OPERATOR

(71) Applicant: ORIGIN QUANTUM COMPUTING TECHNOLOGY (HEFEI) CO., LTD., Anhui (CN)

(72) Inventors: Menghan Dou, Anhui (CN); Yuan Fang, Anhui (CN); Zhaohui Zhou, Anhui (CN); Hanchao Wang, Anhui (CN); Lei Li, Anhui (CN)

(73) Assignee: Origin Quantum Computing Technology (Hefei) Co., Ltd., Anhui (CN)

( * ) Notice: Subject to any disclaimer, the term of this patent is extended or adjusted under 35 U.S.C. 154(b) by 0 days.

(21) Appl. No.: 18/278,723

(22) PCT Filed: Feb. 23, 2022

(86) PCT No.: PCT/CN2022/077508
§ 371 (c)(1),
(2) Date: Aug. 24, 2023

(87) PCT Pub. No.: WO2022/179533
PCT Pub. Date: Sep. 1, 2022

(65) Prior Publication Data
US 2024/0095563 A1    Mar. 21, 2024

(30) Foreign Application Priority Data

Feb. 26, 2021   (CN) .................. 202110213240.X
Mar. 30, 2021   (CN) .................. 202110339877.3
(Continued)

(51) Int. Cl.
*G06N 10/20*    (2022.01)

(52) U.S. Cl.
CPC .............................. *G06N 10/20* (2022.01)

(58) Field of Classification Search
None
See application file for complete search history.

(56) References Cited

U.S. PATENT DOCUMENTS

2017/0286858 A1    10/2017   La Cour et al.
2020/0364598 A1*   11/2020   Ashikhmin ............ G06N 10/00

FOREIGN PATENT DOCUMENTS

CN    109767004 A    5/2019
CN    111260065 A    6/2020
(Continued)

OTHER PUBLICATIONS

Cong et al., Quantum Convolutional Neural Networks, arXiv:1810.03787v2 [quant-ph] May 2, 2019; pp. 1-12 (Year: 2019).*
(Continued)

*Primary Examiner* — Alan Chen
(74) *Attorney, Agent, or Firm* — Baker Botts LLP

(57) ABSTRACT

The present disclosure provides a quantum convolution operator, comprising: a quantum state encoding module, a quantum entanglement module, a quantum convolution kernel module, a measuring module, and a computing module; the quantum state encoding module is configured to encode a current group of input data onto qubits; the quantum entanglement module is configured to associate quantum state information of different qubits; the quantum convolution kernel module is configured to extract feature information corresponding to the quantum state information; the measuring module is configured to measure a quantum state of a preset qubit and obtain a corresponding amplitude; the computing module is configured to compute a convolution result corresponding to the current group of input data according to the measured quantum state and its amplitude.

9 Claims, 15 Drawing Sheets

(30) Foreign Application Priority Data

| Apr. 29, 2021 | (CN) | 202110473480.3 |
| Apr. 29, 2021 | (CN) | 202110475104.8 |
| Jun. 28, 2021 | (CN) | 202110722243.6 |
| Dec. 31, 2021 | (CN) | 202111683374.4 |

(56) References Cited

FOREIGN PATENT DOCUMENTS

| CN | 111915011 A | 11/2020 |
| CN | 112001498 A | 11/2020 |

OTHER PUBLICATIONS

Quantum Convolutional Neural Networks (Year: 2019).*

\* cited by examiner

QUANTUM CONVOLUTION OPERATOR

CROSS-REFERENCE TO RELATED APPLICATIONS

The disclosure is a National Stage of International Application No. PCT/CN2022/077508, filed on Feb. 23, 2022, which claims priority to a Chinese patent application No. 202110213240.X filed on Feb. 26, 2021 and entitled "IMPLEMENTATION METHOD AND DEVICE OF QUANTUM CONVOLUTION OPERATION", which are hereby incorporated by reference in their entireties.

The disclosure also claims priority to a Chinese patent application No. 202110473480.3 filed on Apr. 29, 2021 and entitled "CONVOLUTION OPERATION METHOD AND DEVICE BASED ON QUANTUM CIRCUIT", which is hereby incorporated by reference in its entirety.

The disclosure also claims priority to a Chinese patent application No. 202110339877.3 filed on Mar. 30, 2021 and entitled "QUANTUM IMAGE RECOGNITION METHOD AND DEVICE", which is hereby incorporated by reference in its entirety.

The disclosure also claims priority to a Chinese patent application No. 202110475104.8 filed on Apr. 29, 2021 and entitled "DISPLAY METHOD AND DEVICE FOR QUANTUM IMAGE RECOGNITION", which is hereby incorporated by reference in its entirety.

The disclosure also claims priority to a Chinese patent application No. 202110722243.6 filed on Jun. 28, 2021 and entitled "IMAGE RECOGNITION METHOD AND DEVICE BASED ON QUANTUM CLASSICAL HYBRID NEURAL NETWORK", which is hereby incorporated by reference in its entirety.

The disclosure also claims priority to a Chinese patent application No. 202111683374.4 filed on Dec. 31, 2021 and entitled "QUANTUM CONVOLUTION OPERATOR", which is hereby incorporated by reference in its entirety.

TECHNICAL FIELD

The present disclosure relates to the field of quantum computation, in particular to a quantum convolution operator. The present disclosure also relates to an implementation method and device of quantum convolution operation. The present disclosure also relates to a convolution operation method and device based on quantum circuit. The present disclosure also relates to a quantum image recognition method and device. The present disclosure also relates to a display method and device for quantum image recognition. The present disclosure also relates to an image recognition method and device based on quantum classical hybrid neural networks.

BACKGROUND

A quantum computer is a type of physical device that follows the laws of quantum mechanics to perform high-speed mathematical and logical operations, to store and to process quantum information. Whenever a device processes and computes quantum information and runs quantum algorithms, it is a quantum computer. The quantum computer has become a key technology under research because it has the ability to deal with mathematical problems more efficiently than an ordinary computer, for example, it can speed up the time cost for cracking the RSA key from hundreds of years to a few hours.

In the field of classical computers, convolutional neural network models can be used in image recognition, natural language processing, speech recognition and other fields, aiming to extract feature information in information carriers such as images, languages, and speech. However, how quantum computing technology can be applied to the field of neural network models needs to be explored urgently.

SUMMARY

The objective of the present disclosure is to provide a quantum convolution operator to address deficiencies in prior art, which enables application of quantum computing in the field of convolution neural network models, so as to take advantage of the parallelism of quantum computing and to complement gaps in related technologies.

One embodiment of the present disclosure provides a quantum convolution operator, which comprises: a quantum state encoding module, a quantum entanglement module, a quantum convolution kernel module, a measuring module, and a computing module;
  the quantum state encoding module is configured to encode a current group of input data onto qubits;
  the quantum entanglement module is configured to associate quantum state information of different qubits;
  the quantum convolution kernel module is configured to extract feature information corresponding to the quantum state information;
  the measuring module is configured to measure a quantum state of a preset qubit and obtain a corresponding amplitude;
  the computing module is configured to compute a convolution result corresponding to the current group of input data according to the measured quantum state and its amplitude.

Optionally, the quantum state encoding module comprises quantum logic gates; said "encode the current group of input data onto qubits", comprises:
  determining a variable parameter value in a quantum logic gate corresponding to the current group of input data, wherein the quantum logic gate supports dynamic modification of the variable parameter value.

Optionally, the quantum convolution operator further comprises an updating module, which is configured to update a parameter value of a quantum state encoding module corresponding to the next group of input data according to a preset mapping relationship.

Optionally, said "update a parameter value of a quantum state encoding module corresponding to the next group of input data according to a preset mapping relationship", comprises:
  according to a preset mapping relationship between the input data and quantum state encoding circuits of the quantum state encoding module, updating a quantum state encoding circuit corresponding to the next group of input data so as to obtain a new quantum state encoding circuit as an updated quantum state encoding module.

Optionally, said "compute a convolution result corresponding to the input data according to the measured quantum state and its amplitude", comprises:
  according to the measured quantum state and its amplitude, computing a probability corresponding to when the preset qubit is in a preset quantum state as a convolution result corresponding to the current group of input data.

Optionally, in the case where the quantum entanglement module and/or the quantum convolution kernel module comprises a quantum logic gate, a variable parameter value in the quantum logic gate is determined by pre-training.

Optionally, the input data comprises: an image, natural language, or audio data.

Optionally, the quantum state comprises a following quantum logic gate: an RX gate, an RY gate, an RZ gate, or an X gate.

Optionally, the quantum entanglement module comprises: CNOT gates acting on two adjacent qubits, wherein the last CNOT gate acts on the last qubit and the first qubit.

Optionally, the quantum convolution kernel module comprises a U3 gate of a quantum logic gate, wherein a unitary matrix of the U3 gate is:

$$R(\alpha, \beta, \gamma) = \begin{bmatrix} \cos\left(\frac{\alpha}{2}\right) & -e^{i\gamma} \times \sin\left(\frac{\alpha}{2}\right) \\ e^{i\beta} \times \sin\left(\frac{\alpha}{2}\right) & e^{i\gamma+i\beta} \times \cos\left(\frac{\alpha}{2}\right) \end{bmatrix}$$

wherein $\alpha$, $\beta$, and $\gamma$ are angular variables.

Compared with prior art, with the quantum convolution operator provided by the present disclosure comprising: a quantum state encoding module, a quantum entanglement module, a quantum convolution kernel module, a measuring module, and a computing module; the quantum state encoding module is configured to encode a current group of input data onto qubits; the quantum entanglement module is configured to associate quantum state information of different qubits; the quantum convolution kernel module is configured to extract feature information corresponding to the quantum state information; the measuring module is configured to measure a quantum state of a preset qubit and obtain a corresponding amplitude; the computing module is configured to compute a convolution result corresponding to the current group of input data according to the measured quantum state and its amplitude, it is possible to realize the application of quantum computing in the field of convolution neural network models, so as to take advantage of the parallelism of quantum computing and to complement gaps in related technologies.

The object of the present disclosure is also to provide an implementation method and device of quantum convolution operation to address deficiencies in prior art, which enables the application of quantum computing in the field of convolution neural network models, so as to take advantage of the parallelism of quantum computing and to complement gaps in related technologies.

One embodiment of the present disclosure provides an implementation method of quantum convolution operation, comprising:
  obtaining a first attribute value of property information of a target object;
  inputting the first attribute value to a pre-trained quantum convolution model, wherein the quantum convolution model is constructed from a quantum circuit containing a variable parameter, and a first parameter value of a first variable parameter of a first preset quantum logic gate in the quantum circuit is determined by the first attribute value;
  operating the pre-trained quantum convolution model so as to output a convolution result corresponding to the first attribute value.

Optionally, the target object comprises: an image, natural language, or audio data.

Optionally, the quantum circuit containing a variable parameter comprises:
  a quantum state encoding sub-circuit comprising a first preset quantum logic gate, which is configured to encode an attribute value onto a quantum state;
  a quantum entanglement sub-circuit comprising a second preset quantum logic gate, which is configured to associate quantum state information of different qubits;
  a quantum convolution kernel sub-circuit comprising a third preset quantum logic gate, which is configured to extract the feature information of the attribute value carried by the quantum state information and output the corresponding convolution result;
  wherein, if the second preset quantum logic gate is a preset quantum logic gate containing the variable parameter, the second preset quantum logic gate is treated as the first preset quantum logic gate or the third preset quantum logic gate, the second parameter value of the second variable parameter of the third preset quantum logic gate is determined by iterative updating, and the number of qubits in the quantum state encoding sub-circuit, the quantum entanglement sub-circuit, and the quantum convolution kernel sub-circuit is the same, and all are the number of attribute values.

Optionally, the pre-trained quantum convolution model is trained as followed:
  constructing the quantum circuit comprising the quantum state encoding sub-circuit, the quantum entanglement sub-circuit and the quantum convolution nuclear sub-circuit;
  obtaining a second attribute value of attribute information of a training object, computing the first parameter value of the first preset quantum logic gate in the quantum circuit according to the type of the first preset quantum logic gate and the second attribute value, and initializing the second parameter value of the third preset quantum logic gate in the quantum circuit;
  operating the current quantum circuit, measuring the quantum state output by the current quantum circuit, and computing the convolution result corresponding to the second attribute value according to the measured result;
  comparing the convolution result with a preset desired value, iteratively updating the second parameter value with a training algorithm if the convolution result does not reach the preset desired value, until the computed convolution result reaches the preset desired value, wherein the training algorithm comprises: a gradient descent method, a Newton method, a Quasi-Newton method, or a conjugate gradient method;
  treating the quantum circuit containing the iteratively updated second parameter value as the trained quantum convolution model.

Optionally, said "inputting the first attribute value to a pre-trained quantum convolution model", comprises:
  computing the first parameter value corresponding to the first attribute value according to the type of the first preset quantum logic gate;
  inputting the first parameter value corresponding to the first attribute value into the quantum circuit containing the iteratively updated second parameter value so as to obtain a quantum circuit comprising the first parameter value corresponding to the first attribute value and the iteratively updated second parameter value.

Optionally, said "operating the pre-trained quantum convolution model so as to output a convolution result corresponding to the first attribute value", comprises:

operating the quantum circuit comprising the first parameter value corresponding to the first attribute value and the iteratively updated second parameter value so as to output a quantum state corresponding to the first attribute value;

measuring a quantum state of a preset bit of qubit in the quantum circuit, and determining the probability that the measured quantum state is a state as the convolution result corresponding to the first attribute value;

or, measuring the quantum state of each qubit in the quantum circuit, and computing the convolution result corresponding to the first attribute value according to the measured quantum states and their probabilities.

Optionally, said "computing the convolution result corresponding to the first attribute value according to the measured quantum states and their probabilities", comprises:

accumulating the product of the decimal value corresponding to each quantum state and the probability of that quantum state so as to obtain the convolution result corresponding to the first attribute value.

Another embodiment of the present disclosure provides an implementation device of quantum convolution operation, which comprises:

a data obtaining module configured to obtain a first attribute value of property information of a target object;

an input determining module configured to input the first attribute value to a pre-trained quantum convolution model, wherein the quantum convolution model is constructed from a quantum circuit containing a variable parameter, and a first parameter value of a first variable parameter of a first preset quantum logic gate in the quantum circuit is determined by the first attribute value;

an operating-outputting module configured to operate the pre-trained quantum convolution model so as to output a convolution result corresponding to the first attribute value.

Yet another embodiment of the present disclosure provides a storage medium in which a computer program is stored, wherein the computer program is set to execute any one of the above methods at runtime.

Yet another embodiment of the present disclosure provides an electronic device comprising a memory and a processor, the memory is stored with a computer program therein, and the processor is set to run the computer program to execute any one of the above methods.

Compared with prior art, in the implementation method of quantum convolution operation of the present disclosure, by first obtaining a first attribute value of property information of a target object; inputting the first attribute value into the pre-trained quantum convolution model, wherein the quantum convolution model is constructed by the quantum circuit containing the variable parameter, and the first parameter value of the first variable parameter of the first preset quantum logic gate in the quantum circuit is determined by the first attribute value; operating the pre-trained quantum convolution model so as to output the convolution result corresponding to the first attribute value, it is possible to realize the application of quantum computing in the field of convolution neural network models, so as to take advantage of the parallelism of quantum computing and to complement gaps in related technologies.

The object of the present disclosure is also to provide a convolution operation method and device based on quantum circuits to address deficiencies in prior art, which enables the application of quantum computing in the field of convolution neural network models, so as to take advantage of the parallelism of quantum computing and to complement gaps in related technologies.

One embodiment of the present disclosure provides a convolution operation method based on quantum circuits, which comprises:

receiving a group of attribute values of the attribute information of the target data;

encoding the group of attribute values into a pre-trained quantum circuit for a convolution operation; wherein the quantum circuit comprises an encoding sub-circuit module for encoding the attribute values, and a one-layer or multi-layer training sub-circuit module for training;

operating the quantum circuit to measure the quantum circuit, and determining the convolution result of the group of attribute values according to the measured result.

Optionally, the target data comprises: an image, natural language, or audio data.

Optionally, the encoding sub-circuit module comprises a first parameter-containing quantum logic gate which comprises a first tunable parameter;

Said "encoding the group of attribute values into a pre-trained quantum circuit for a convolution operation", comprises:

computing a first tunable parameter value of the first tunable parameter according to the group of attribute values;

inputting the first tunable parameter value into the first parameter-containing quantum logic gate.

Optionally, the training sub-circuit module comprises a second adjustable parameter for a second parameter-containing quantum logic gate being trained, and the number of qubits of the training sub-circuit module is the same as the encoding sub-circuit module, and both are the number of the group of attribute values.

Optionally, said "measure the quantum circuit, and determining the convolution result of the group of attribute values according to the measured result", comprises:

measuring all qubits of the quantum circuit to obtain each quantum state and their amplitudes of all the qubits;

computing the probability corresponding to the amplitude, and computing the convolution result of the group of attribute values according to all the quantum states and their probabilities.

Optionally, said "computing the convolution result of the group of attribute values according to all the quantum states and their probabilities", comprises:

accumulating the product of the decimal value corresponding to each quantum state and the probability, and determining the accumulated sum as the convolution result of the group of attribute values.

Optionally, said "computing the convolution result of the group of attribute values according to all the quantum states and their probabilities", comprises:

computing the convolution result of the group of attribute values according to the number of preset substrates in each quantum state and its corresponding probability.

Yet another embodiment of the present disclosure provides a convolution operation device based on quantum circuits, which comprises:
- a receiving module configured to receive a group of attribute values of the attribute information of the target data;
- an encoding module configured to encode the group of attribute values into a pre-trained quantum circuit for a convolution operation; wherein the quantum circuit comprises an encoding sub-circuit module for encoding the attribute values, and a one-layer or multi-layer training sub-circuit module for training;
- a determining module configured to operate the quantum circuit to measure the quantum circuit, and determining the convolution result of the group of attribute values according to the measured result.

Yet another embodiment of the present disclosure provides a storage medium in which a computer program is stored, wherein the computer program is set to execute any one of the above methods at runtime.

Yet another embodiment of the present disclosure provides an electronic device comprising a memory and a processor, the memory is stored with a computer program therein, and the processor is set to run the computer program to execute any one of the above methods.

Compared with prior art, in the convolution operation device based on quantum circuits of the present disclosure, by first receiving a group of attribute values of the attribute information of the target data, encoding the group of attribute values into a pre-trained quantum circuit for a convolution operation; wherein the quantum circuit comprises an encoding sub-circuit module for encoding the attribute values, and a one-layer or multi-layer training sub-circuit module for training; operating the quantum circuit to measure the quantum circuit, and determining the convolution result of the group of attribute values according to the measured result, it is possible to realize the application of quantum computing in the field of convolution neural network models, so as to take advantage of the parallelism of quantum computing and to complement gaps in related technologies.

The object of the present disclosure is also to provide a quantum image recognition method and device to address deficiencies in prior art, which enables the application of quantum computing to neural networks for image recognition, so as to take advantage of the parallelism of quantum computing and to complement gaps in related technologies.

One embodiment of the present disclosure provides a quantum image recognition method, which comprises:
- receiving target image data;
- inputting the target image data into a pre-trained one-layer or multi-layer quantum convolution neural network for quantum convolution operations, operating the quantum convolution neural network, obtaining and measuring the quantum state carrying the feature information of the target image data, wherein the quantum convolution neural network is constructed by a quantum circuit containing tunable parameters;
- inputting the measured result of the quantum state to a pre-selected trained classical neural network and outputting a recognition result of the target image data.

Optionally, the target image data includes: grayscale image data or color image data.

Optionally, the quantum convolution neural network comprises: a quantum state encoding sub-circuit, a quantum entanglement sub-circuit and a quantum convolution kernel sub-circuit; wherein the quantum state encoding sub-circuit is configured to encode the pixel information of the target image data onto the quantum state;
the quantum entanglement sub-circuit is configured to associate quantum state information of different qubits;
the quantum convolution kernel sub-circuit is configured to extract the feature information corresponding to the pixels carried by quantum state information.

Optionally, said "inputting the target image data into a pre-trained one-layer or multi-layer quantum convolution neural network for quantum convolution operations", comprises:
- determining the parameter value to be input of the quantum logic gate in the quantum state encoding sub-circuit according to the pixel information of the target image data;
- inputting the parameter value to be input into the quantum state encoding sub-circuit.

Optionally, said "operating the quantum convolution neural network, obtaining and measuring the quantum state carrying the feature information of the target image data", comprises:
- operating the quantum state encoding sub-circuit, the quantum entanglement sub-circuit, and the quantum convolution kernel sub-circuit successively under the condition that the one-layer or multi-layer quantum convolution neural network is one layer;
- measuring a preset qubits in the quantum convolution kernel sub-circuit so as to obtain the measured individual quantum states and their probabilities to be used as the measured result of the quantum convolution neural network;
- operating each layer of quantum convolution neural network successively under the condition that one-layer or multi-layer quantum convolution neural network is multi-layer, measuring the preset qubits in the quantum convolution kernel sub-circuit in each layer of quantum convolution neural network until obtaining the measured result of last layer of quantum convolution neural network, wherein the next layer of quantum convolution neural network is input depending on the measured result of the previous layer of quantum convolution neural network.

Optionally, said "inputting the measured result of the quantum state to a pre-selected trained classical neural network and outputting a recognition result of the target image data", comprises:
- computing a convolution result of the target image data according to the measured result of the quantum convolution neural network;
- inputting the convolution result into the pre-selected trained classical neural network, and computing a probability corresponding to each image category according to weights of neurons in the classical neural network;
- outputting a recognition result of the target image data according to probability corresponding to each image category.

Yet another embodiment of the present disclosure provides a quantum image recognition device, which comprises:
- a data receiving module configured to receive target image data;
- an inputting-operating module configured to input the target image data into a pre-trained one-layer or multi-layer quantum convolution neural network for quantum convolution operations, operating the quantum convolution neural network, obtaining and measuring the quantum state carrying the feature information of the target image data, wherein the quantum convolution neural network is constructed by a quantum circuit containing tunable parameters; and a result outputting module configured to input the measured result of the quantum state to a pre-selected trained classical neural network and outputting a recognition result of the target image data.

Yet another embodiment of the present disclosure provides a storage medium in which a computer program is stored, wherein the computer program is set to execute any one of the above methods at runtime.

Yet another embodiment of the present disclosure provides an electronic device comprising a memory and a processor, the memory is stored with a computer program therein, and the processor is set to run the computer program to execute any one of the above methods.

Compared with prior art, in the quantum image recognition method provided by the present disclosure, by receiving target image data, inputting the target image data into a pre-trained one-layer or multi-layer quantum convolution neural network for quantum convolution operations, operating the quantum convolution neural network, obtaining and measuring the quantum state carrying the feature information of the target image data, wherein the quantum convolution neural network is constructed by a quantum circuit containing tunable parameters; then, inputting the measured result of the quantum state to a pre-selected trained classical neural network and outputting a recognition result of the target image data, it is possible to realize the application of quantum computing in the field of convolution neural network, so as to take advantage of the parallelism of quantum computing and to complement gaps in related technologies.

The objective of the present disclosure is to provide a display method and device for quantum image recognition to address deficiencies in prior art, which enables the application of quantum computing to neural networks for image recognition, so as to take advantage of the parallelism of quantum computing and to complement gaps in related technologies.

One embodiment of the present disclosure provides a display method for quantum image recognition, which comprises:

receiving an input operation of a user for a target image;
displaying the target image in a first area in response to the input operation;
receiving a recognition operation of a user for the target image;
in response to the recognition operation, recognizing the target image with a pre-trained quantum convolution neural network for recognizing image, and outputting a recognition result of the target image; wherein the quantum convolution neural network is constructed by a quantum circuit containing tunable parameters;
displaying the recognition result of the target image in a second area.

Optionally, the target image includes: grayscale image data or color image data.

Optionally, said "recognizing the target image with a pre-trained quantum convolution neural network for recognizing image, and outputting a recognition result of the target image", comprises:

inputting the target image into a pre-trained one-layer or multi-layer quantum convolution neural network for quantum convolution operation, operating the quantum convolution neural network, and obtaining and measuring a quantum state carrying feature information of the target image;
inputting a measured result of the quantum state into the pre-selected trained classical neural network, and outputting a recognition result of the target image.

Optionally, the quantum convolution neural network comprises: a quantum state encoding sub-circuit, a quantum entanglement sub-circuit and a quantum convolution kernel sub-circuit; wherein, the quantum state encoding sub-circuit is configured to encode pixel information of the target image onto a quantum state;
the quantum entanglement sub-circuit is configured to associate quantum state information of different qubits;
the quantum convolution kernel sub-circuit is configured to extract the feature information corresponding to the pixels carried by quantum state information.

Optionally, said "inputting the target image into a pre-trained one-layer or multi-layer quantum convolution neural network for quantum convolution operation", comprises:

determining a parameter value to be input of a quantum logic gate in the quantum state encoding sub-circuit according to the pixel information of the target image;
inputting the parameter value to be input into the quantum state encoding sub-circuit.

Optionally, said "operating the quantum convolution neural network, and obtaining and measuring a quantum state carrying feature information of the target image", comprises:

operating the quantum state encoding sub-circuit, the quantum entanglement sub-circuit, and the quantum convolution kernel sub-circuit successively under the condition that one-layer or multi-layer quantum convolution neural network is one layer;
measuring a preset qubits in the quantum convolution kernel sub-circuit so as to obtain the measured individual quantum states and their probabilities to be used as the measured result of the quantum convolution neural network;
operating each layer of quantum convolution neural network successively under the condition that one-layer or multi-layer quantum convolution neural network is multi-layer, measuring the preset qubits in the quantum convolution kernel sub-circuit in each layer of quantum convolution neural network until obtaining the measured result of last layer of quantum convolution neural network, wherein the next layer of quantum convolution neural network is input depending on the measured result of the previous layer of quantum convolution neural network.

Optionally, said "inputting a measured result of the quantum state into the pre-selected trained classical neural network, and outputting a recognition result of the target image", comprises:

computing the convolution result of the target image according to the measured result of the quantum convolution neural network;
inputting the convolution result into the pre-selected trained classical neural network, and computing a probability corresponding to each image category according to weights of neurons in the classical neural network;
outputting the recognition result of the target image according to the probability corresponding to each image category.

Another embodiment of the present disclosure provides a display device for quantum image recognition, which comprises:
- a first response module configured to display the target image in a first area in response to the input operation;
- a second receiving module configured to receive a recognition operation of a user for the target image;
- a second response module configured to recognize the target image with a pre-trained quantum convolution neural network for recognizing image in response to the recognition operation, and output a recognition result of the target image; wherein the quantum convolution neural network is constructed by a quantum circuit containing tunable parameters;
- a result displaying module configured to display the recognition result of the target image in a second area.

Yet another embodiment of the present disclosure provides a storage medium in which a computer program is stored, wherein the computer program is set to execute any one of the above methods at runtime.

Yet another embodiment of the present disclosure provides an electronic device comprising a memory and a processor, the memory is stored with a computer program therein, and the processor is set to run the computer program to execute any one of the above methods.

Compared with prior art, in the display method for quantum image recognition provided by the present disclosure, by receiving an input operation of a user for a target image; displaying the target image in a first area in response to the input operation; receiving a recognition operation of a user for the target image; in response to the recognition operation, recognizing the target image with a pre-trained quantum convolution neural network for recognizing image, and outputting a recognition result of the target image; wherein the quantum convolution neural network is constructed by a quantum circuit containing tunable parameters; displaying the recognition result of the target image in a second area, it is possible to realize the application of quantum computing in the field of convolution neural network, so as to take advantage of the parallelism of quantum computing and to complement gaps in related technologies.

An object of the present disclosure is to provide an image recognition method and device based on quantum classical hybrid neural network to address deficiencies in prior art, which enables the application of quantum computing to neural networks for image recognition, so as to take advantage of the parallelism of quantum computing and to complement gaps in related technologies.

One embodiment of the present disclosure provides an image recognition method based on quantum classical hybrid neural network, which comprises:
- receiving target image data; wherein the target image data is grayscale image data or color image data;
- inputting the target image data into a pre-trained quantum classical hybrid neural network for image recognition, wherein the quantum classical hybrid neural network comprises: a feature learning module and a classifying module, and the feature learning module comprises: a quantum convolution kernel represented by a quantum circuit;
- operating the quantum classical hybrid neural network and outputting a recognition result of the target image data.

Optionally, the quantum circuit comprises: an encoding sub-circuit for pixel value encoding, one or more training sub-circuits for training, and the feature learning module further comprises: a pooling layer.

Optionally, the encoding sub-circuit comprises a first parameter-containing quantum logic gate, and the first parameter-containing quantum logic gate comprises a first tunable parameter;
said "inputting the target image data into a pre-trained quantum classical hybrid neural network for image recognition", comprises:
for each group of pixel values of the target image data, computing a first tunable parameter value of the first tunable parameter corresponding to the group of pixel values;
inputting the first tunable parameter value into the first parameter-containing quantum logic gate.

Optionally, the training sub comprises a second tunable parameter for use in a trained second parameter containing quantum logic gate, and the number of qubits of the training sub-circuit is the same as that of the encoding sub-circuit, and both are the number of a group of pixel values.

Optionally, the classifying module comprises: a fully connected layer;
said "operating the quantum classical hybrid neural network and outputting a recognition result of the target image data", comprises:
performing convolution operation on each group of pixel values through the quantum convolution kernel, and outputting a convolved first feature map;
performing pooling operation on the first feature map through the pooling layer, and outputting a pooled second feature map;
classifying the second feature map through the fully connected layer, and outputting a classification result as a recognition result of the target image data.

Optionally, said "performing convolution operation on each group of pixel values through the quantum convolution kernel, and outputting a convolved first feature map", comprises:
operating the quantum circuit, measuring the quantum circuit, and determining the convolution result of each group of pixel values according to the measured result, and the convolution result constitutes a first feature map.

Optionally, said "measuring the quantum circuit, and determining the convolution result of each group of pixel values according to the measured result", comprises:
measuring all qubits of the quantum circuit to obtain each quantum state and their amplitudes of all the qubits;
computing the probability corresponding to the amplitude, and computing convolution results of each group of pixel values according to the number of the preset substrates in each quantum state and the corresponding probability thereof.

Yet another embodiment of the present disclosure provides an image recognition device based on quantum classical hybrid neural network, which comprises:
- a receiving module configured to receive target image data; wherein the target image data is grayscale image data or color image data;
- an inputting module configured to input the target image data into a pre-trained quantum classical hybrid neural network for image recognition, wherein the quantum classical hybrid neural network comprises: a feature learning module and a classifying module, and the feature learning module comprises: a quantum convolution kernel represented by a quantum circuit;
- an outputting module configured to operate the quantum classical hybrid neural network and outputting a recognition result of the target image data.

Yet another embodiment of the present disclosure provides a storage medium in which a computer program is stored, wherein the computer program is set to execute any one of the above methods at runtime.

Yet another embodiment of the present disclosure provides an electronic device comprising a memory and a processor, the memory is stored with a computer program therein, and the processor is set to run the computer program to execute any one of the above methods.

Compared with prior art, in the image recognition method based on quantum classical hybrid neural network provided by the present disclosure, by receiving target image data; wherein the target image data is grayscale image data or color image data; inputting the target image data into a pre-trained quantum classical hybrid neural network for image recognition, wherein the quantum classical hybrid neural network comprises: a feature learning module and a classifying module, and the feature learning module comprises: a quantum convolution kernel represented by a quantum circuit; operating the quantum classical hybrid neural network and outputting a recognition result of the target image data, it is possible to realize the application of quantum computing in the field of convolution neural network, so as to take advantage of the parallelism of quantum computing and to complement gaps in related technologies.

DETAILED DESCRIPTION

Figure 1:
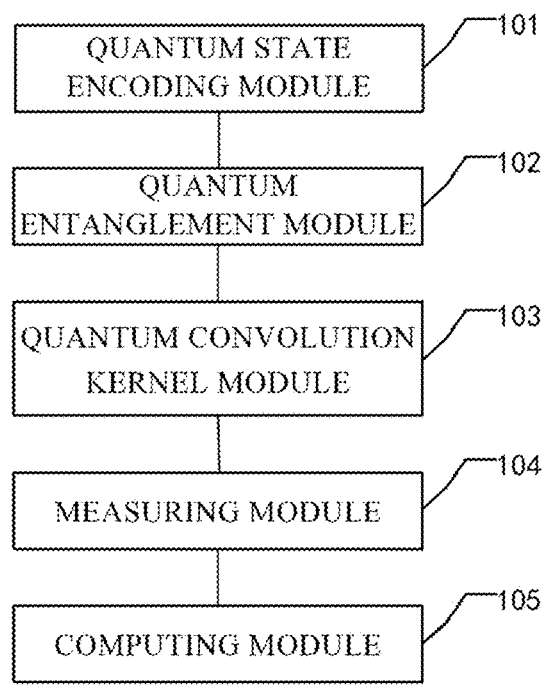
FIG. 1 is a structural schematic diagram of a quantum convolution operator provided by an embodiment of the present disclosure.

The embodiments described below with reference to the accompanying drawings are exemplary and are intended to explain the invention only and are not to be construed as limiting the invention.

The present disclosed embodiment also provides a quantum convolution operator, which may be applied to an electronic devices, such as computer terminals, such as ordinary computers, quantum computers, etc.

It should be noted that a real quantum computer is hybrid in structure and consists of two main parts: a classical computer, which is responsible for performing classical computation and control, and a quantum device, which is responsible for running a quantum program and thus realizing quantum computation. The quantum program is a sequence of instructions written in a quantum language, such as Qrunes, that can be run on the quantum computer, which enables support for a quantum logic gate operation and ultimately quantum computation. Specifically, the quantum program is a sequence of instructions that operates the quantum logic gate in a certain time sequence.

In practical applications, due to the development of hardware of quantum devices, quantum computing simulations are often required to verify quantum algorithms, quantum applications, and so on. Quantum computing simulation refers to the process of using the virtual architecture (that is, quantum virtual machine) built with the resources of ordinary computers to realize the simulation operation of quantum programs corresponding to specific problems. Often, it is necessary to construct quantum programs corresponding to specific problems. The quantum program referred to in the embodiment of the present disclosure is a program written in a classical language characterizing qubits and their evolution, wherein qubits, quantum logic gates, etc. related to quantum computing are represented by corresponding classical codes.

The quantum circuit, as an embodiment of a quantum program, is also known as a quantum logic circuit, is the most commonly used general-purpose quantum computation model, represents a circuit that operates on a qubit in an abstract concept, consists of a qubit, a circuit (a timeline), and a variety of quantum logic gates, and is often required to read out the results of the final quantum measurement operation.

Unlike a conventional circuit where metal wires are connected to transmit a voltage or current signal, in the quantum circuit, the circuit can be viewed as connected by time, i.e., the state of the qubit evolves naturally over time following the instructions of the Hamiltonian operator, until it encounters a logic gate and is operated.

A quantum program as a whole corresponds to a total quantum circuit. The quantum program in this disclosure refers to the total quantum circuit, wherein the total number of qubits in the total quantum circuit is the same as the total number of qubits in the quantum program. It can be understood that a quantum program can be composed of a quantum circuit, measurement operations for the qubits in the quantum circuit, a register for storing the measured results, and a control flow node (jump instruction). A quantum circuit can contain tens, hundreds or even thousands of quantum logic gate operations. The process of executing a quantum program is the process of executing all quantum logic gates according to a certain time sequence. It should be noted that time sequence is the time sequence in which a single quantum logic gate is executed.

It should be noted that in classical computing, the most basic unit is a bit, and the most basic control mode is a logic gate. The purpose of controlling the circuit can be achieved through the combination of logic gates. Similarly, the way to handle qubits is quantum logic gates. Quantum states can be evolved using quantum logic gates. Quantum logic gates are the basis of quantum circuits, and quantum logic gates include single-bit quantum logic gates, such as Hadamard gate (H gate, Hadamard gate), Pauli-X gate (X gate), Pauli-Y gate (Y gate), Pauli-Z gate (Z gate), RX gate, RY gate, RZ gate, etc.; a double-bit or multi-bit quantum logic gate, such as CNOT gate, CR gate, CZ gate, iSWAP gate, Toffoli gate, etc. Quantum logic gates are generally represented by unitary matrices, and unitary matrices are not only in the form of matrices, but also a kind of operation and transformation. Generally, the function of a quantum logic gate on a quantum state is computed by multiplying the left side of the unitary matrix by the matrix corresponding to the right vector of the quantum state.

Referring to FIG. 1, FIG. 1 is a structural schematic diagram of a quantum convolution operator provided by an embodiment of the present disclosure. The quantum convolution operator may include: a quantum state encoding module 101, a quantum entanglement module 102, a quantum convolution kernel module 103, a measuring module 104, and a computing module 105;

the quantum state encoding module 101 is configured to encode a current group of input data onto qubits;

Specifically, the quantum state encoding module may include a quantum logic gates. By encoding the current group of input data onto qubits, it is possible to determine a variable parameter value in a quantum logic gate corresponding to the current group of input data, wherein the quantum logic gate supports dynamic modification of the variable parameter value.

Exemplarily, the input data includes, but is not limited to: images, natural language, or audio data, and the quantum state encoding module includes, but is not limited to, RX gates, RY gates, RZ gates, or X gates of quantum logic gates, wherein RX gates, RY gates, and RZ gates directly support dynamic modification of the variable parameter value, and the unitary matrix of RX gates is a fixed parameter value. In the present disclosure, the unitary matrix is defined as a quantum logic gate including a variable parameter, which can be called a variational quantum gate (VQG), that is, the RX gate, the RY gate, and the RZ gate are VQG_RX, VQG_RY, and VQG_RZ.

Figure 2:
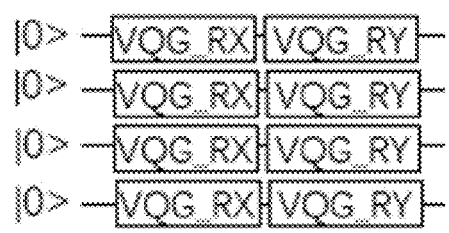
FIG. 2 is a structural schematic diagram of a quantum state encoding module provided by an embodiment of the present disclosure.
Figure 3A:
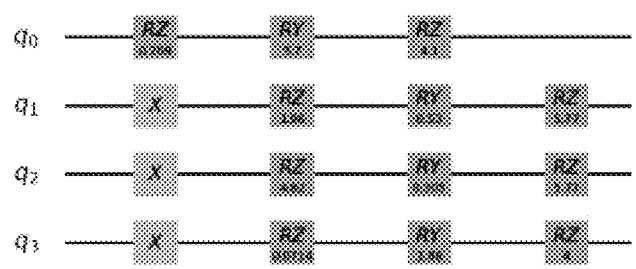
FIG. 3 is a schematic diagram of a preset mapping relationship between input data and a quantum state encoding circuit provided by an embodiment of the present disclosure.
Figure 3B:
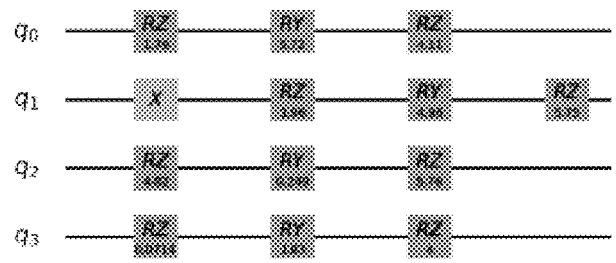
Figure 3C:
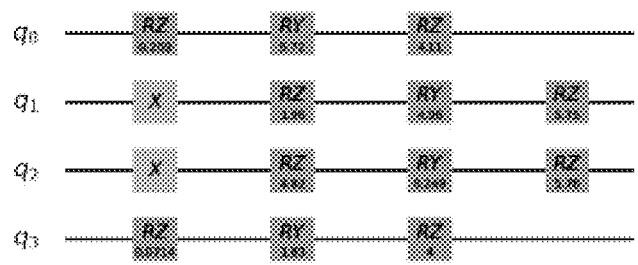
Figure 3D:
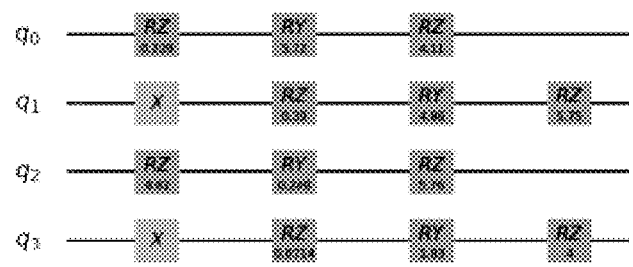

Exemplarily, FIG. 2 is a structural schematic diagram of the quantum state encoding module. As shown in FIG. 2, the quantum circuit includes four qubits corresponding to four input data, and each qubit includes VQG_RX, VQG_RY quantum logic gate operations in turn. The parameters of a quantum logic gate can be the arctangent value corresponding to the input data or the arctangent value of the input data squared, or the parameter value=input data*π/2, etc. It should be noted that the present disclosure does not limit the type, number of the quantum logic gate or how the parameter is computed.

Specifically, the quantum convolution operator may further comprise an updating module, which is configured to update a parameter value of a quantum state encoding module corresponding to the next group of input data according to a preset mapping relationship.

After the current group of input data is computed, the structure of the quantum state encoding module can be updated according to the difference of the input data, and then operating the updated quantum state encoding module, that is, updating the next group of input data onto qubits of the new quantum state encoding module. For example, the next group of input data may be encoded onto the qubits using a basis encoding method.

In practical applications, according to a preset mapping relationship between the input data and quantum state coding circuits, a quantum state coding circuit corresponding to the next group of input data can be updated so as to obtain a new quantum state coding circuit as an updated quantum state encoding module.

Figure 4:
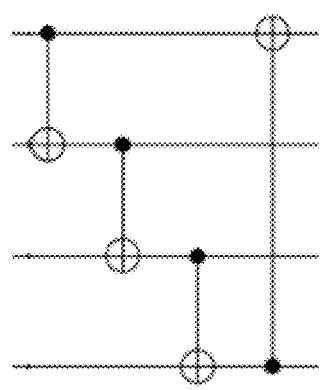
FIG. 4 is a structural schematic diagram of a quantum entanglement module provided by an embodiment of the present disclosure.
Figure 5:
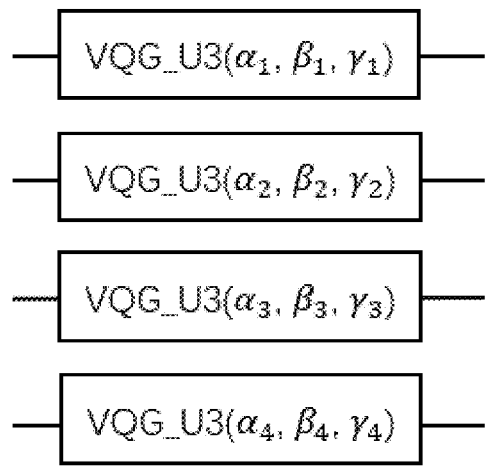
FIG. 5 is a structural schematic diagram of a quantum convolution kernel module provided by an embodiment of the present disclosure.

Exemplarily, FIG. 3 is a schematic diagram of a preset mapping relationship between input data and a quantum state encoding circuit. As shown in FIG. 3, FIGS. 3(a), 3(b), 3(c), 3(d) are corresponding quantum state coding circuits when the input data is 0111, 0100, 0110, 0101, respectively, including: qubits $q_0$, $q_1$, $q_2$, $q_3$, and quantum logic gates RX gate, RY gate, RZ gate, and X gate.

the quantum entanglement module 102 is configured to associate quantum state information of different qubits;

Specifically, the quantum entanglement module may include: a CNOT gate acting on two neighboring qubits, wherein the last CNOT gate acts on the last qubit and the first qubit. For example, a structural schematic diagram of a quantum entanglement module shown in FIG. 4 includes four CONT gates, each CNOT gate is represented by an icon ⊕ and its solid-line connections, the qubits under action of solid-lines are control bits, and the qubits acted by the icon ⊕ are controlled bits.

the quantum convolution kernel module 103 is configured to extract feature information corresponding to the quantum state information;

Specifically, the quantum convolution kernel module comprises a U3 gate of a quantum logic gate, wherein a unitary matrix of the U3 gate is:

$$R(\alpha, \beta, \gamma) = \begin{bmatrix} \cos\left(\frac{\alpha}{2}\right) & -e^{i\gamma} \times \sin\left(\frac{\alpha}{2}\right) \\ e^{i\beta} \times \sin\left(\frac{\alpha}{2}\right) & e^{i\gamma+i\beta} \times \cos\left(\frac{\alpha}{2}\right) \end{bmatrix}$$

wherein $\alpha$, $\beta$, and $\gamma$ are angular variables. The structural schematic diagram of the quantum convolution kernel module shown in FIG. 5 includes four variational quantum gates "VQG_U3 gates", and each VQG_U3 gate acts on one qubit, which can dynamically modify the angle variable and avoid resource loss caused by repeated construction of circuits.

the measuring module 104 is configured to measure a quantum state of a preset qubit and obtain a corresponding amplitude;

Specifically, the measuring module may include a quantum measurement operation "Measure", and specifically, a preset qubit may be set according to requirements, for example, a first qubit or all qubits.

A quantum state is the logical state of a qubit. In a quantum algorithm (or quantum program), the quantum state of a set of qubits contained in a quantum circuit is represented in binary. For example, a set of qubits is $q_1$, $q_2$, $q_3$, representing the $1^{st}$, $2^{nd}$, and $3^{rd}$ qubits and sorted from high to low in binary representation as $q_2q_1q_0$. The quantum states corresponding to this set of qubits have a total of 2 qubits to the power of the total, that is, 8 eigenstates (determined states): |000>, |001>, |010>, |011>, |100>, |101>, |110>, |111>. The bit of each quantum state corresponds to the qubit, such as |001> state, 001 corresponds to $q_2q_1q_0$ from high to low, and |> is the Dirac symbol. For a quantum circuit containing N qubits $q_0, q_1, \ldots, q_n, \ldots, q_{N-1}$, the order of the bits of quantum states represented in binary is $q_{N-1}q_{N-2} \ldots q_1q_0$.

Taking a single qubit for example, the logic state of the single qubit may be in the state of |0>, the state of |1>, and the superposition state (uncertain state) of the |0> state and the |1> state, and can be specifically expressed as $\psi=a|0>+b|1>$, wherein a and b are complex numbers representing the amplitude (probability amplitude) of the quantum state, the square of the amplitude represents the probability, $a^2$ and $b^2$ represent the probabilities that the logic states are the |0> state and the |1> state, respectively, and $a^2+b^2=1$. In short, the quantum state is a superposition state of various eigenstates, and when the probability of other states is 0, it is in a uniquely determined eigenstate.

The computing module 105 is configured to compute a convolution result corresponding to the current group of input data according to the measured quantum state and its amplitude.

Specifically, according to the measured quantum state and its amplitude, the probability corresponding to when the preset qubit is in the preset quantum state can be computed as the convolution result corresponding to the current group of input data.

Exemplarily, it is possible to measure the amplitude of the |1> state of the 1st qubit, calculate the square of the modulus of the amplitude as the corresponding probability, and use it as the convolution result of the current group of input data. Or, measuring the amplitude of all qubits assuming the |1111> state of $4^{th}$ bit, computing the square of the modulus of the amplitude as the corresponding probability, and using it as the convolution result of the current group of input data.

Specifically, in the case where the quantum entanglement module and/or quantum convolution kernel module includes quantum logic gates, the variable parameter value in the quantum logic gate can be determined by pre-training.

In one implementation, the quantum convolution operator is trained as follows:

receiving a group of input data from a training dataset, encoding the group of input data onto qubits through the quantum state encoding module, and initializing a variant parameter value in the quantum entanglement module and the quantum convolution kernel module, wherein the variant parameter value can be determined by random initialization or set to a fixed initial value according to requirements;

operating the quantum convolution operator, performing measurement by the measuring module, and computing the convolution result corresponding to the current group of input data according to the measured quantum state and its amplitude comparing the convolution result with a preset expected value, and if the convolution result does not reach a preset expected value, iteratively updating the variant parameter value by using a training algorithm until the determined convolution result reaches the preset expected value, wherein the training algorithm may include: a gradient descent method (more specifically, a back propagation algorithm), a Newton method, a quasi-Newton method, a conjugate gradient method, or the like;

using the quantum convolution operator containing the updated variant parameter value as the trained quantum convolution operator.

It can be seen that the present disclosure provides a quantum convolution operator, which comprises: a quantum state encoding module, a quantum entanglement module, a quantum convolution kernel module, a measuring module and a computing module; the quantum state encoding module is configured to encode a current group of input data onto qubits; the quantum entanglement module is configured to associate quantum state information of different qubits; the quantum convolution kernel module is configured to extract feature information corresponding to the quantum state information; the measuring module is configured to measure a quantum state of a preset qubit and obtain a corresponding amplitude; the computing module is configured to compute a convolution result corresponding to the current group of input data according to the measured quantum state and its amplitude, therefore realizing the application of quantum computing in the field of convolution neural network models, so as to take advantage of the parallelism of quantum computing and to complement gaps in related technologies.

An embodiment of the present disclosure provides an implementation method of quantum convolution operation, which can be applied to an electronic device, such as a computer terminal, specifically, an ordinary computer, a quantum computer, etc.

Figure 6:
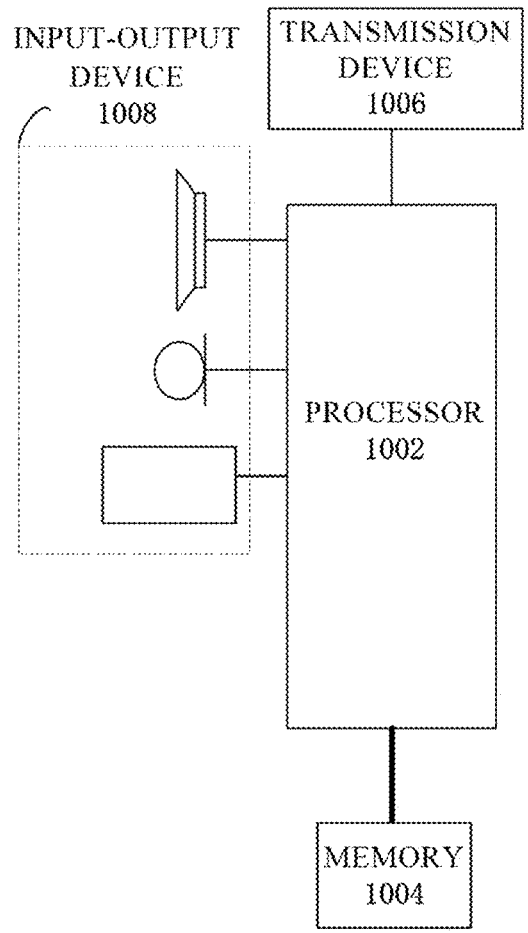
FIG. 6 is a structural block diagram of hardware of a computer terminal of an implementation method of quantum convolution operation provided by an embodiment of the present disclosure.

It will be described in detail below by taking running on a computer terminal as an example. FIG. 6 is a structural block diagram of hardware of a computer terminal of an implementation method of quantum convolution operation provided by an embodiment of the present disclosure. As shown in FIG. 6, the computer terminal may include one or more (only one is shown in FIG. 6) processors 1002 (the processors 1002 may include, but are not limited to, a processing device such as a microprocessor MCU or a programmable logic device FPGA) and a memory 1004 for storing data. Optionally, the above computer terminal may further include a transmission device 1006 and an input-output device 1008 for a communication function. Those skilled in the art can understand that the structure shown in FIG. 6 is only schematic, and does not limit the structure of the computer terminal. For example, the computer terminal may also include more or fewer components than shown in FIG. 6, or have a different configuration than shown in FIG. 6.

The memory 1004 may be used to store a software program as well as a module for application software, such as program instructions/modules corresponding to the implementation method of quantum convolution operation in embodiments of the present disclosure. The processor 1002 executes various functional applications as well as data processing, i.e., implements the above-described method, by running the software program as well as the module stored in the memory 1004. The memory 1004 may include a high-speed random memory, and may also include a non-volatile memory, such as one or more magnetic storage devices, flash memory, or other non-volatile solid-state memory. In some examples, the memory 1004 may further include memories set remotely relative to the processor 1002, and these remote memories may be connected to the computer terminal via a network. An example of the network includes, but is not limited to, the Internet, an enterprise intranet, a local area network, a mobile communication network, and combinations thereof.

The transmission device 1006 is used to receive or send data via a network. A specific example of the above network may include a wireless network provided by a communications provider of a computer terminal. In one example, the transmission device 1006 includes a Network Interface Controller (NIC) that may be connected to other network devices via a base station so that it may communicate with the Internet. In one example, the transmission device 1006 may be a Radio Frequency (RF) module for communicating wirelessly with the Internet.

It should be noted that a real quantum computer is hybrid in structure and consists of two main parts: a classical computer, which is responsible for performing classical computation and control, and a quantum device, which is responsible for running a quantum program and thus realizing quantum computation. The quantum program is a sequence of instructions written in a quantum language, such as Qrunes, that can be run on the quantum computer, which enables support for a quantum logic gate operation and ultimately quantum computation. Specifically, the quantum program is a sequence of instructions that operates the quantum logic gate in a certain time sequence.

In practical applications, due to the development of hardware of quantum devices, quantum computing simulations are often required to verify quantum algorithms, quantum applications, and so on. Quantum computing simulation refers to the process of using the virtual architecture (that is, quantum virtual machine) built with the resources of ordinary computers to realize the simulation operation of quantum programs corresponding to specific problems. Often, it is necessary to construct quantum programs corresponding to specific problems. The quantum program referred to in the embodiment of the present disclosure is a program written in a classical language characterizing qubits and their evolution, wherein qubits, quantum logic gates, etc. related to quantum computing are represented by corresponding classical codes.

The quantum circuit, as an embodiment of a quantum program, is also known as a quantum logic circuit, is the most commonly used general-purpose quantum computation model, represents a circuit that operates on a qubit in an abstract concept, consists of a qubit, a circuit (a timeline), and a variety of quantum logic gates, and is often required to read out the results of the final quantum measurement operation.

Unlike a conventional circuit where metal wires are connected to transmit a voltage or current signal, in the quantum circuit, the circuit can be viewed as connected by time, i.e., the state of the qubit evolves naturally over time following the instructions of the Hamiltonian operator, until it encounters a logic gate and is operated.

A quantum program as a whole corresponds to a total quantum circuit. The quantum program in this disclosure refers to the total quantum circuit, wherein the total number of qubits in the total quantum circuit is the same as the total number of qubits in the quantum program. It can be understood that a quantum program can be composed of a quantum circuit, measurement operations for the qubits in the quantum circuit, a register for storing the measured results, and a control flow node (jump instruction). A quantum circuit can contain tens, hundreds or even thousands of quantum logic gate operations. The process of executing a quantum program is the process of executing all quantum logic gates according to a certain time sequence. It should be noted that time sequence is the time sequence in which a single quantum logic gate is executed.

It should be noted that in classical computing, the most basic unit is a bit, and the most basic control mode is a logic gate. The purpose of controlling the circuit can be achieved through the combination of logic gates. Similarly, the way to handle qubits is quantum logic gates. Quantum states can be evolved using quantum logic gates. Quantum logic gates are the basis of quantum circuits, and quantum logic gates include single-bit quantum logic gates, such as Hadamard gate (H gate, Hadamard gate), Pauli-X gate (X gate), Pauli-Y gate (Y gate), Pauli-Z gate (Z gate), RX gate, RY gate, RZ gate, etc.; a double-bit or multi-bit quantum logic gate, such as CNOT gate, CR gate, CZ gate, iSWAP gate, Toffoli gate, etc. Quantum logic gates are generally represented by unitary matrices, and unitary matrices are not only in the form of matrices, but also a kind of operation and transformation. Generally, the function of a quantum logic gate on a quantum state is computed by multiplying the left side of the unitary matrix by the matrix corresponding to the right vector of the quantum state.

Figure 7:
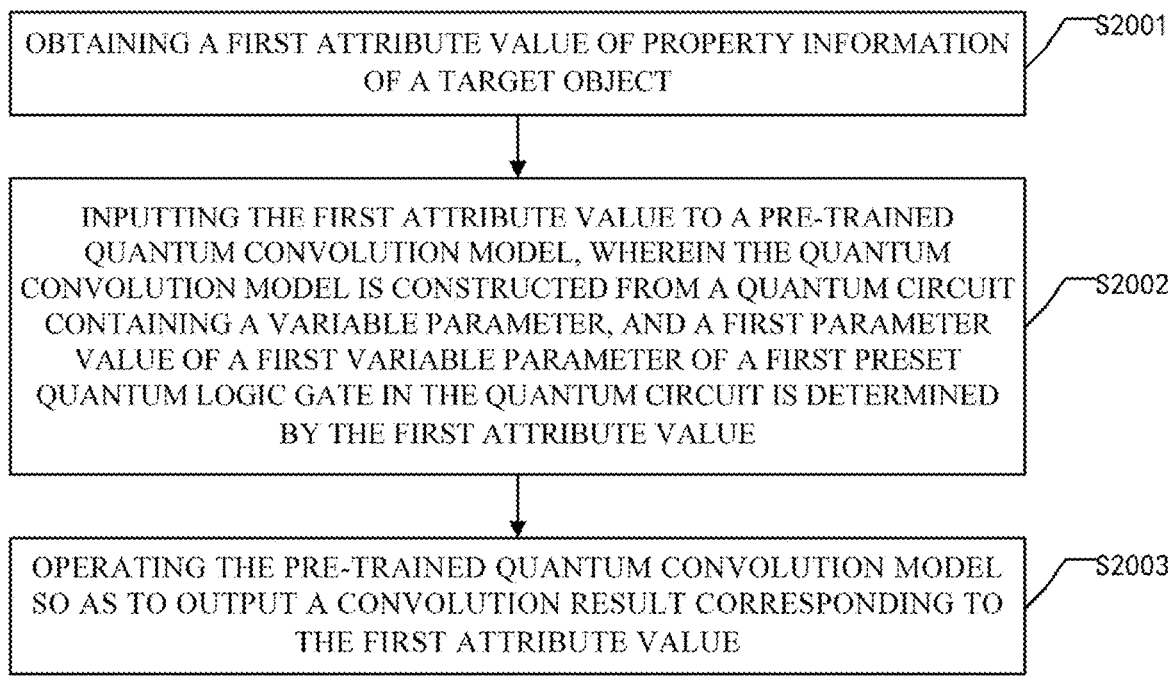
FIG. 7 is a schematic flow chart of an implementation method of quantum convolution operation provided by an embodiment of the present disclosure.

See FIG. 7, FIG. 7 is a schematic flow chart of an implementation method of quantum convolution operation provided by an embodiment of the present disclosure, which may comprise the following steps:

S2001, obtaining a first attribute value of property information of a target object;

Specifically, the target object may include, but is not limited to, an image, natural language, or audio information, such as an image of each frame of a video, an individually shot picture, a language text of a chat record, voice information, and so on. Attribute information refers to information that carries and embodies the implicit characteristics of a target object. Taking an image as an example, the attribute information of the image includes pixel information, contour information, color information, label information, etc., and the attribute value is the visualized data value corresponding to the attribute information, such as pixel value, label value, etc.

Exemplarily, the target object is an image, the attribute information is pixel information, the first attribute value is a pixel value, and the image can be embodied as data in a specific digital form. The image data is a matrix, and each element of the matrix is a pixel value. In practical applications, a specific number of elements (one element value is one pixel value) of the image data matrix can be obtained, and the specific number is set by the user according to specific needs.

S2002, inputting the first attribute value to a pre-trained quantum convolution model, wherein the quantum convolution model is constructed from a quantum circuit containing a variable parameter, and a first parameter value of a first variable parameter of a first preset quantum logic gate in the quantum circuit is determined by the first attribute value;

Specifically, a quantum circuit containing a variable parameter may include the following sub-circuits:
a quantum state encoding sub-circuit comprising a first preset quantum logic gate, which is configured to encode an attribute value onto a quantum state;
a quantum entanglement sub-circuit comprising a second preset quantum logic gate, which is configured to associate quantum state information of different qubits;
a quantum convolution kernel sub-circuit comprising a third preset quantum logic gate, which is configured to extract the feature information of the attribute value carried by the quantum state information and output the corresponding convolution result;

Wherein, the distinction of the preset quantum logic gate is determined by the sub-circuit to which it belongs, and is not divided by the type of quantum logic gate, that is, the quantum logic gate belonging to the quantum state encoding sub-circuit is the first preset quantum logic gate, the quantum logic gate belonging to the quantum entanglement sub-circuit is the second preset quantum logic gate, and the quantum logic gate belonging to the quantum convolution kernel sub-circuit is the third preset quantum logic gate.

It should be noted that if the second preset quantum logic gate is a preset quantum logic gate containing a variable parameter, the second preset quantum logic gate may be regarded as the first preset quantum logic gate or the third preset quantum logic gate. Moreover, the second parameter value of the second variable parameter of the third preset quantum logic gate can be determined through iterative updating, and the number of qubits in the quantum state encoding sub-circuit, the quantum entanglement sub-circuit, and the quantum convolution kernel sub-circuit are the same, which is the number of attribute values.

Figure 8:
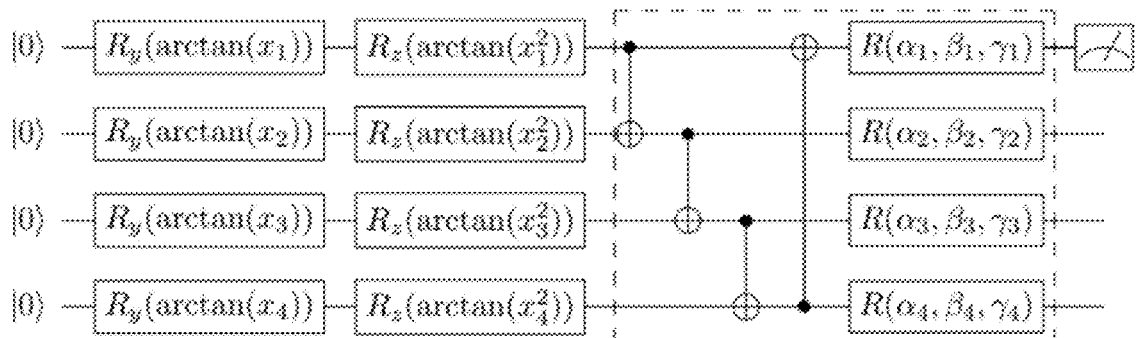
FIG. 8 is a structural schematic diagram of a quantum circuit containing a variable parameter provided by an embodiment of the present disclosure.

In one implementation, FIG. 8 is a structural schematic diagram of a quantum circuit containing a variable parameter, which comprises:
four qubits with an initial state of the $|0\rangle$ state, corresponding to four input attribute values; )
4 RY gates and 4 RZ gates that make up the quantum state encoding sub-circuit, for a total of 8 first preset quantum logic gates, wherein, the first parameter value (rotation angle value) of the rotation angle parameter contained in the RY gate can specifically be the arctangent value $\arctan(x_1)$, $\arctan(x_2)$, $\arctan(x_3)$, $\arctan(x_4)$ of four input attribute values $x_1, x_2, x_3, x_4$; the first parameter value of the rotation angle contained in the RZ gate can specifically be arctangent value $\arctan(x_1^2)$, $\arctan(x_2^2)$, $\arctan(x_3^2)$, of the square of the four input attribute values $x_1, x_2, x_3, x_4$;

In the four second preset quantum logic gates "CNOT gates" that make up the quantum entanglement sub-circuit, and the icon of the CNOT door is indicated by the ⊕ and its connection;

In the four third quantum logical gate "U3 gates" that make up the quantum convolution kernel sub-circuit, each U3 gate contains 3 variable second parameters $\alpha$, $\beta$, $\gamma$. As shown in $R(\alpha_1, \beta_1, \gamma_1)$, $R(\alpha_2, \beta_2, \gamma_2)$, $R(\alpha_3, \beta_3, \gamma_3)$, $R(\alpha_4, \beta_4, \gamma_4)$ of FIG. 8, the corresponding second parameter value is determined by iterative updating; and, measurement operations on the 1st qubit located at the end of the circuit; wherein the unitary matrix of the U3 gate is:

$$R(\alpha, \beta, \gamma) = \begin{bmatrix} \cos\left(\frac{\alpha}{2}\right) & -e^{i\gamma} \times \sin\left(\frac{\alpha}{2}\right) \\ e^{i\beta} \times \sin\left(\frac{\alpha}{2}\right) & e^{i\gamma+i\beta} \times \cos\left(\frac{\alpha}{2}\right) \end{bmatrix}$$

Figure 9:
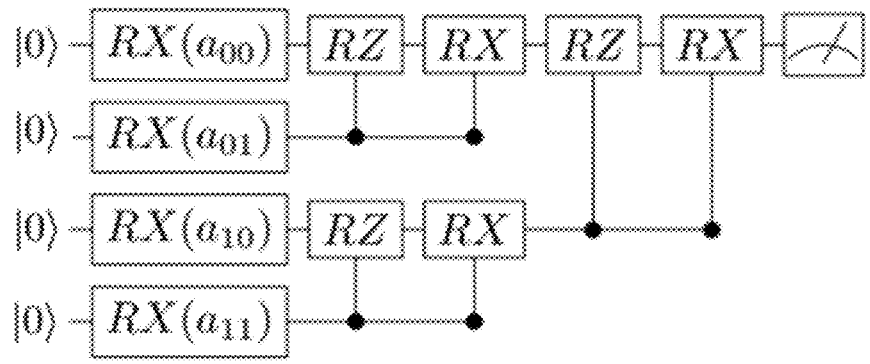
FIG. 9 is a structural schematic diagram of another quantum circuit containing a variable parameter provided by an embodiment of the present disclosure.

In another implementation, FIG. 9 is a structural schematic diagram of another quantum circuit containing a variable parameter, which comprises:
four qubits with an initial state of the $|0\rangle$ state;
in the four first preset quantum logic gates RX gates that make up the quantum state encoding sub-circuit, the first parameter value of the rotation angle (rotation angle value) contained in the RX gate can specifically be arctangent value of four input attribute values $a_{00}$, $a_{01}, a_{10}, a_{11}$ or the arctangent value of square of the four input attribute values $a_{00}, a_{01}, a_{10}, a_{11}$;

A quantum entanglement-convolution kernel sub-circuit acting as both a quantum entanglement sub-circuit and a quantum convolution kernel sub-circuit, includes three controlled RZ gates and three controlled RX gates, the six preset quantum logic gates are all preset quantum logic gates containing a variable parameter, and are all regarded as a third preset quantum logic gate here, and the corresponding second parameter value is determined by iterative updating; and the measurement operation on the 1st qubit at the end of the circuit.

Figure 10:
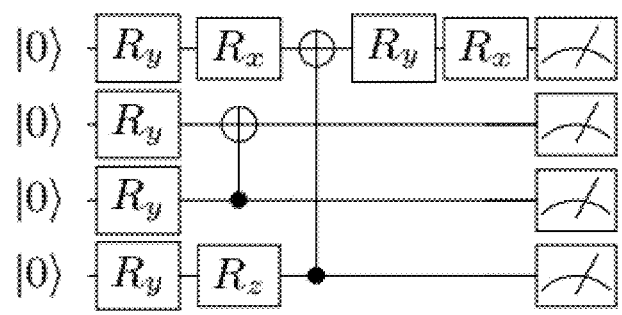
FIG. 10 is a structural schematic diagram of yet another quantum circuit containing a variable parameter provided by an embodiment of the present disclosure.

In another implementation, FIG. 10 is a structural schematic diagram of yet another quantum circuit containing a variable parameter, which comprises:
four qubits with an initial state of the $|0\rangle$ state;
in the four first preset quantum logic gates RY gates that make up the quantum state encoding sub-circuit, the first parameter value of the rotation angle contained in the RY gate can specifically be arctangent value of four input attribute values;
the four second preset quantum logic gates that make up the quantum entanglement sub-circuit include one RX gate, one RZ gate and two CONT gates, and the RX gate and the RZ gate are preset quantum logic gates containing the variable parameter and are regarded as the first preset quantum logic gates here, and the corresponding first parameter value may be the arctangent value of the input attribute value at the corresponding qubit position;

the two preset quantum logic gates that make up the quantum convolution kernel sub-circuit, includes one RY gate and one RX gate, and the corresponding parameter value is determined by iterative updating; and the measurement operation on all qubit position located at the end of the circuit.

Specifically, the pre-trained quantum convolution module can be trained as follows:

S20021, constructing the quantum circuit comprising the quantum state encoding sub-circuit, the quantum entanglement sub-circuit and the quantum convolution nuclear sub-circuit;

Wherein, the quantum circuit is constructed by the above implementation, and there are no restrictions on the types of quantum circuits containing variable parameters, the types and quantities of quantum logic gates, and the calculation method of the first parameter value.

S20022, obtaining a second attribute value of attribute information of a training object, computing the first parameter value of the first preset quantum logic gate in the quantum circuit according to the type of the first preset quantum logic gate and the second attribute value, and initializing the second parameter value of the third preset quantum logic gate in the quantum circuit;

wherein, the training object can be of the same category as the target object, for example, both are images; the attribute information of the training object can be the same as that of the target object, for example, both are pixel information; the second attribute value is also a pixel value (the difference from the first attribute value is that the object it belongs to, one corresponds to the target object, and the other corresponds to the target object);

the first parameter value is determined by the calculation of the first preset quantum logic gate and the second attribute value, for example, the first parameter value of the RY gate shown in FIG. 8 is the arctangent value of the second attribute value, and the first parameter value of the RZ gate is the arctangent value of the square of the second attribute value; the initial second parameter value can be determined by random initialization or set to a fixed value as needed.

S20023, operating the current quantum circuit, measuring the quantum state output by the current quantum circuit, and computing the convolution result corresponding to the second attribute value according to the measured result;

Specifically, after the first parameter value and the second parameter value are determined respectively, operating the current quantum circuit, the probability of the state of the $1^{st}$ qubit may be measured as the measured result and directly used as the convolution result; the quantum states of all the qubits and their probabilities can be measured as the measured result, and then based on the measured result, computing the corresponding convolution result, for example, the decimal value corresponding to each binary quantum state (e.g., |0011⟩, corresponding to decimal 3) is accumulated with the product of the corresponding probabilities, and the sum of the accumulations is used as the convolution result.

S20024, comparing the convolution result with a preset desired value, iteratively updating the second parameter value with a training algorithm if the convolution result does not reach the preset desired value, until the computed convolution result reaches the preset desired value, wherein the training algorithm comprises: a gradient descent method, a Newton method, a Quasi-Newton method, or a conjugate gradient method;

If the convolution result does not reach the preset desired value, the training can be performed by a commonly used training algorithm such as the gradient descent method (more specifically, it can be the back-propagation algorithm) so as to iteratively update the second parameter value, until the convolution result reaches the preset desired value to complete training and obtain the pre-trained second parameter value.

S20025, treating the quantum circuit containing the iteratively updated second parameter value as the trained quantum convolution model.

Specifically, with regard to "inputting the first attribute value to a pre-trained quantum convolution model", it is possible to compute the first parameter value corresponding to the first attribute value according to the type of the first preset quantum logic gate; wherein the first parameter value corresponding to the first attribute value is computed in the same manner as the second attribute value;

inputting the first parameter value corresponding to the first attribute value into the quantum circuit containing the iteratively updated second parameter value so as to obtain a quantum circuit comprising the first parameter value corresponding to the first attribute value and the iteratively updated second parameter value.

S2003, operating the pre-trained quantum convolution model so as to output a convolution result corresponding to the first attribute value.

Specifically, it is possible to operate the quantum circuit comprising the first parameter value corresponding to the first attribute value and the iteratively updated second parameter value so as to output a quantum state corresponding to the first attribute value;

measuring a quantum state of a preset bit of qubit in the quantum circuit, and determining the probability that the measured quantum state is a state as the convolution result corresponding to the first attribute value; wherein, the preset bit of qubit is the same as the qubit measured during training and can be the $1^{st}$ qubit;

or, measuring the quantum state of each qubit in the quantum circuit, and computing the convolution result corresponding to the first attribute value according to the measured quantum states and their probabilities, and specifically, it is possible to accumulate the product of the decimal value corresponding to each quantum state and the probability of that quantum state so as to obtain the convolution result corresponding to the first attribute value. It should be noted that the calculation method of the convolution result here is consistent with the calculation method of the convolution result used in the training process.

It can be understood by those skilled in the art that, in practical applications, a single convolution operation is capable of extracting some of the implicit feature information in the target object, and the final convolution result of the target object can be extracted through the superposition of multi-layer convolution. Simply based on the coverage of the convolution feature extraction, i.e., the number of input data in the range of the convolution kernel (the number of input attribute values), the quantum convolution operation applies for the same number of qubits (the number of n), constructs the quantum circuit and trains it, and employs the trained quantum circuit to perform the convolution operation on the classical data. It is only necessary to encode the data into a quantum state, and then perform quantum state evolution and measurements via a quantum circuit to obtain a single convolution result. The complexity of the quantum operation can be up to $O(\log(n))$, which improves the efficiency of convolution computation to a great extent.

It can be seen that by obtaining a first attribute value of property information of a target object; inputting the first attribute value into the pre-trained quantum convolution model, wherein the quantum convolution model is constructed by the quantum circuit containing the variable parameter, and the first parameter value of the first variable parameter of the first preset quantum logic gate in the quantum circuit is determined by the first attribute value; operating the pre-trained quantum convolution module to output the convolution result corresponding to the first attribute value, it is possible to realize the application of quantum computing in the field of convolutional modeling, so as to take advantage of the parallelism of quantum computing and to complement gaps in related technologies.

Figure 11:
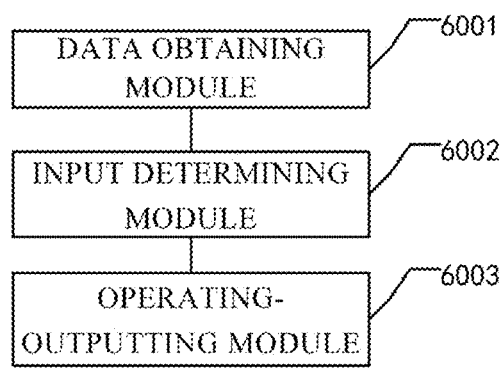
FIG. 11 is a structural schematic diagram of an apparatus for implementing a quantum convolution operation provided by an embodiment of the present disclosure.

Referring to FIG. 11, FIG. 11 is a structural schematic diagram of a quantum lookup device for cointegration pairs in financial transaction data provided by an embodiment of the present disclosure, which corresponds to the process shown in FIG. 7, and the device comprises:

a data obtaining module 6001, configured to obtain a first attribute value of property information of a target object;

an input determining module 6002, configured to input the first attribute value to a pre-trained quantum convolution model, wherein the quantum convolution model is constructed from a quantum circuit containing a variable parameter, and a first parameter value of a first variable parameter of a first preset quantum logic gate in the quantum circuit is determined by the first attribute value;

an operating-outputting module 6003, configured to operate the pre-trained quantum convolution model so as to output a convolution result corresponding to the first attribute value.

Specifically, the target object comprises: an image, natural language, or audio data.

Specifically, the quantum circuit containing a variable parameter comprises:

a quantum state encoding sub-circuit comprising a first preset quantum logic gate, which is configured to encode an attribute value onto a quantum state;

a quantum entanglement sub-circuit comprising a second preset quantum logic gate, which is configured to associate quantum state information of different qubits;

a quantum convolution kernel sub-circuit comprising a third preset quantum logic gate, which is configured to extract the feature information of the attribute value carried by the quantum state information and output the corresponding convolution result;

wherein, if the second preset quantum logic gate is a preset quantum logic gate containing the variable parameter, the second preset quantum logic gate is treated as the first preset quantum logic gate or the third preset quantum logic gate, the second parameter value of the second variable parameter of the third preset quantum logic gate is determined by iterative updating, and the number of qubits in the quantum state encoding sub-circuit, the quantum entanglement sub-circuit, and the quantum convolution kernel sub-circuit is the same, and all are the number of attribute values.

Optionally, the pre-trained quantum convolution model is trained as followed:

constructing the quantum circuit comprising the quantum state encoding sub-circuit, the quantum entanglement sub-circuit and the quantum convolution nuclear sub-circuit;

obtaining a second attribute value of attribute information of a training object, computing the first parameter value of the first preset quantum logic gate in the quantum circuit according to the type of the first preset quantum logic gate and the second attribute value, and initializing the second parameter value of the third preset quantum logic gate in the quantum circuit;

operating the current quantum circuit, measuring the quantum state output by the current quantum circuit, and computing the convolution result corresponding to the second attribute value according to the measured result;

comparing the convolution result with a preset desired value, iteratively updating the second parameter value with a training algorithm if the convolution result does not reach the preset desired value, until the computed convolution result reaches the preset desired value, wherein the training algorithm comprises: a gradient descent method, a Newton method, a Quasi-Newton method, or a conjugate gradient method;

treating the quantum circuit containing the iteratively updated second parameter value as the trained quantum convolution model.

Specifically, the input determining module is specifically configured for:

computing the first parameter value corresponding to the first attribute value according to the type of the first preset quantum logic gate;

inputting the first parameter value corresponding to the first attribute value into the quantum circuit containing the iteratively updated second parameter value so as to obtain a quantum circuit comprising the first parameter value corresponding to the first attribute value and the iteratively updated second parameter value.

Specifically, the operating-outputting module comprises:

an operating module configured to operate the quantum circuit comprising the first parameter value corresponding to the first attribute value and the iteratively updated second parameter value so as to output a quantum state corresponding to the first attribute value;

a measuring module configured to measure a quantum state of a preset bit of qubit in the quantum circuit, and determining the probability that the measured quantum state is a state as the convolution result corresponding to the first attribute value;

or, measuring the quantum state of each qubit in the quantum circuit, and computing the convolution result corresponding to the first attribute value according to the measured quantum states and their probabilities.

Specifically, the measuring module is specifically configured for:

accumulating the product of the decimal value corresponding to each quantum state and the probability of that quantum state so as to obtain the convolution result corresponding to the first attribute value.

It can be seen that by obtaining a first attribute value of property information of a target object; inputting the first attribute value into the pre-trained quantum convolution model, wherein the quantum convolution model is constructed by the quantum circuit containing the variable parameter, and the first parameter value of the first variable parameter of the first preset quantum logic gate in the quantum circuit is determined by the first attribute value; operating the pre-trained quantum convolution module to output the convolution result corresponding to the first attribute value, it is possible to realize the application of quantum computing in the field of convolutional modeling, so as to take advantage of the parallelism of quantum computing and to complement gaps in related technologies.

An embodiment of the present disclosure provides a storage medium in which a computer program is stored, wherein the computer program is set to execute the steps of any one of the above method embodiments at runtime.

Specifically, in the present embodiment, the storage medium may be set to store a computer program for performing the following steps:

S01, obtaining a first attribute value of property information of a target object;

S02, inputting the first attribute value to a pre-trained quantum convolution model, wherein the quantum convolution model is constructed from a quantum circuit containing a variable parameter, and a first parameter value of a first variable parameter of a first preset quantum logic gate in the quantum circuit is determined by the first attribute value;

S03, operating the pre-trained quantum convolution model so as to output a convolution result corresponding to the first attribute value.

Specifically, in the present embodiment, the above storage media may include, but are not limited to: U disk, read-only memory (ROM), random access memory (RAM), portable hard disk, disk or optical disc and other media that can store computer programs.

An embodiment of the present disclosure provides an electronic device comprising a memory and a processor, the memory is stored with a computer program therein, and the processor is set to run the computer program to execute the steps of any one of the above method embodiments.

Specifically, the above electronic device may further comprise a transmission device and an input-output device, wherein the transmission device is connected to the above processor, and the input-output device is connected to the above processor.

Specifically, in the present embodiment, the above processor may be set to perform the following steps by a computer program:

S01, obtaining a first attribute value of property information of a target object;

S02, inputting the first attribute value to a pre-trained quantum convolution model, wherein the quantum convolution model is constructed from a quantum circuit containing a variable parameter, and a first parameter value of a first variable parameter of a first preset quantum logic gate in the quantum circuit is determined by the first attribute value;

S03, operating the pre-trained quantum convolution model so as to output a convolution result corresponding to the first attribute value.

An embodiment of the present disclosure further provides a convolution operation method based on quantum circuits, which can be applied to an electronic device, such as a computer terminal, specifically, an ordinary computer, a quantum computer, etc.

Figure 12:
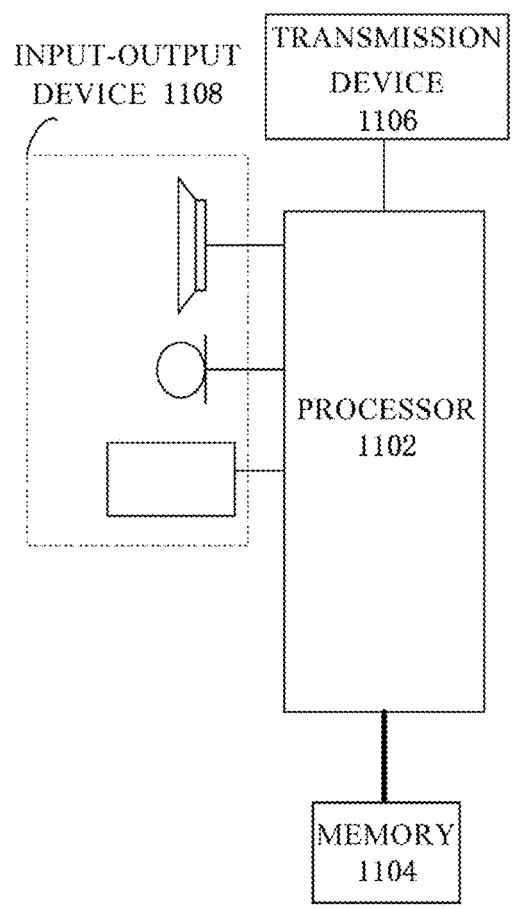
FIG. 12 is a structural block diagram of hardware of a computer terminal based on a convolution operation method for a quantum circuit provided by an embodiment of the present disclosure.

It will be described in detail below by taking running on a computer terminal as an example. FIG. 12 is a structural block diagram of hardware of a computer terminal based on the convolution operation method based on quantum circuits provided by an embodiment of the present disclosure. As shown in FIG. 12, the computer terminal may include one or more (only one is shown in FIG. 12) processors 1102 (the processors 1102 may include, but are not limited to, a processing device such as a microprocessor MCU or a programmable logic device FPGA) and a memory 1104 for storing data. Optionally, the above computer terminal may further include a transmission device 1106 and an input-output device 1108 for a communication function. Those skilled in the art can understand that the structure shown in FIG. 12 is only schematic, and does not limit the structure of the computer terminal. For example, the computer terminal may also include more or fewer components than shown in FIG. 12, or have a different configuration than shown in FIG. 12.

The memory 1104 may be used to store a software program as well as a module for application software, such as program instructions/modules corresponding to the convolution operation method based on quantum circuits in embodiments of the present disclosure. The processor 1102 executes various functional applications as well as data processing, i.e., implements the above-described method, by running the software program as well as the module stored in the memory 1104. The memory 1104 may include a high-speed random memory, and may also include a non-volatile memory, such as one or more magnetic storage devices, flash memory, or other non-volatile solid-state memory. In some examples, the memory 1104 may further include memories set remotely relative to the processor 1102, and these remote memories may be connected to the computer terminal via a network. An example of the network includes, but is not limited to, the Internet, an enterprise intranet, a local area network, a mobile communication network, and combinations thereof.

The transmission device 1106 is used to receive or send data via a network. A specific example of the above network may include a wireless network provided by a communications provider of a computer terminal. In one example, the transmission device 1106 includes a Network Interface Controller (NIC) that may be connected to other network devices via a base station so that it may communicate with the Internet. In one example, the transmission device 1106 may be a Radio Frequency (RF) module for communicating wirelessly with the Internet.

It should be noted that a real quantum computer is hybrid in structure and consists of two main parts: a classical computer, which is responsible for performing classical computation and control, and a quantum device, which is responsible for running a quantum program and thus realizing quantum computation. The quantum program is a sequence of instructions written in a quantum language, such as Qrunes, that can be run on the quantum computer, which enables support for a quantum logic gate operation and ultimately quantum computation. Specifically, the quantum program is a sequence of instructions that operates the quantum logic gate in a certain time sequence.

In practical applications, due to the development of hardware of quantum devices, quantum computing simulations are often required to verify quantum algorithms, quantum applications, and so on. Quantum computing simulation refers to the process of using the virtual architecture (that is, quantum virtual machine) built with the resources of ordinary computers to realize the simulation operation of quantum programs corresponding to specific problems. Often, it is necessary to construct quantum programs corresponding to specific problems. The quantum program referred to in the embodiment of the present disclosure is a program written in a classical language characterizing qubits and their evolution, wherein qubits, quantum logic gates, etc. related to quantum computing are represented by corresponding classical codes.

The quantum circuit, as an embodiment of a quantum program, is also known as a quantum logic circuit, is the most commonly used general-purpose quantum computation model, represents a circuit that operates on a qubit in an abstract concept, consists of a qubit, a circuit (a timeline), and a variety of quantum logic gates, and is often required to read out the results of the final quantum measurement operation.

Unlike a conventional circuit where metal wires are connected to transmit a voltage or current signal, in the quantum circuit, the circuit can be viewed as connected by time, i.e., the state of the qubit evolves naturally over time following the instructions of the Hamiltonian operator, until it encounters a logic gate and is operated.

A quantum program as a whole corresponds to a total quantum circuit. The quantum program in this disclosure refers to the total quantum circuit, wherein the total number of qubits in the total quantum circuit is the same as the total number of qubits in the quantum program. It can be understood that a quantum program can be composed of a quantum circuit, measurement operations for the qubits in the quantum circuit, a register for storing the measured results, and a control flow node (jump instruction). A quantum circuit can contain tens, hundreds or even thousands of quantum logic gate operations. The process of executing a quantum program is the process of executing all quantum logic gates according to a certain time sequence. It should be noted that time sequence is the time sequence in which a single quantum logic gate is executed.

It should be noted that in classical computing, the most basic unit is a bit, and the most basic control mode is a logic gate. The purpose of controlling the circuit can be achieved through the combination of logic gates. Similarly, the way to handle qubits is quantum logic gates. Quantum states can be evolved using quantum logic gates. Quantum logic gates are the basis of quantum circuits, and quantum logic gates include single-bit quantum logic gates, such as Hadamard gate (H gate, Hadamard gate), Pauli-X gate (X gate), Pauli-Y gate (Y gate), Pauli-Z gate (Z gate), RX gate, RY gate, RZ gate, etc.; a double-bit or multi-bit quantum logic gate, such as CNOT gate, CR gate, CZ gate, iSWAP gate, Toffoli gate, etc. Quantum logic gates are generally represented by unitary matrices, and unitary matrices are not only in the form of matrices, but also a kind of operation and transformation. Generally, the function of a quantum logic gate on a quantum state is computed by multiplying the left side of the unitary matrix by the matrix corresponding to the right vector of the quantum state.

Figure 13:
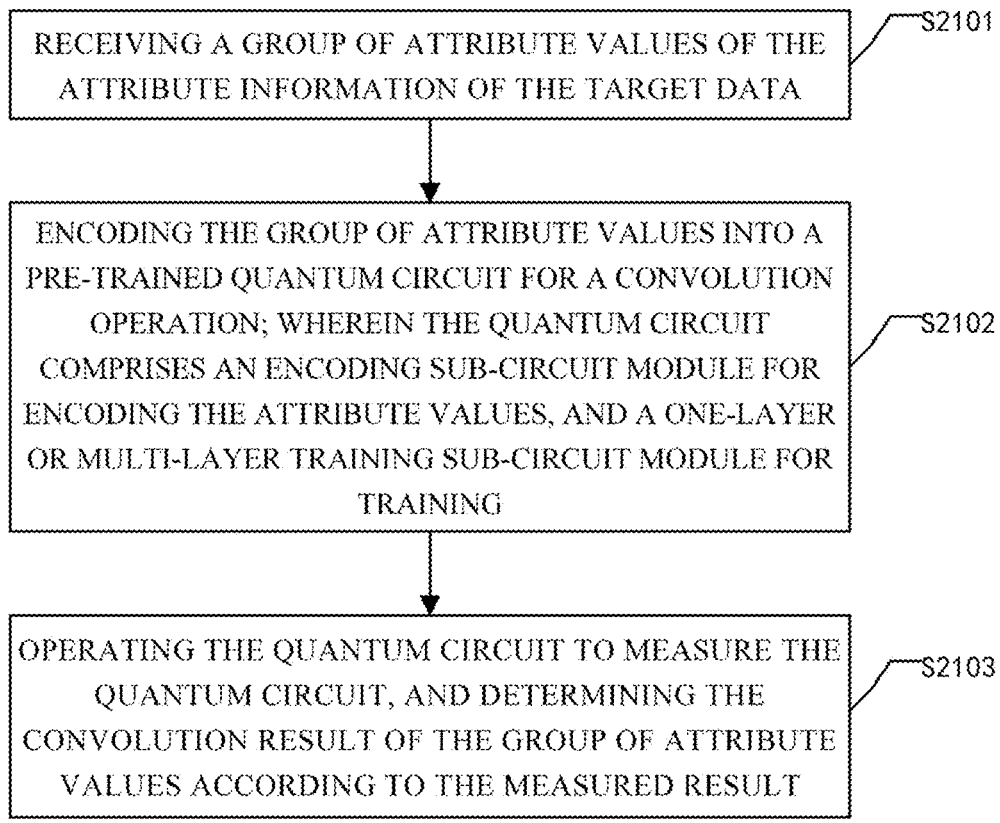
FIG. 13 is a schematic flow chart of a convolution operation method based on a quantum circuit provided by an embodiment of the present disclosure.

Referring to FIG. 13, FIG. 13 is a schematic flow chart of a convolution operation method based on a quantum circuit provided by an embodiment of the present disclosure, which may comprise the following steps:

S2101, receiving a group of attribute values of the attribute information of the target data;

Specifically, the target data may include, but is not limited to, an image, natural language, or audio information, such as an image of each frame of a video, an individually shot picture, a language text of a chat record, voice information, and so on. Attribute information refers to information that carries and embodies the implicit characteristics of a target data. Taking an image as an example, the attribute information of the image includes pixel information, contour information, color information, label information, etc., and the attribute value is the visualized data value corresponding to the attribute information, such as pixel value, label value, etc.

Exemplarily, the target data is an image, the attribute information is pixel information, the first attribute value is a pixel value, and the image can be embodied as data in a specific digital form. The image data is a matrix, and each element of the matrix is a pixel value. In practical applications, each time a group of pixel values of the image data matrix can be received, the number of this group of pixel values is set by the user according to specific needs, such as a group of 4 adjacent pixel values.

S2102, encoding the group of attribute values into a pre-trained quantum circuit for a convolution operation; wherein the quantum circuit comprises an encoding sub-circuit module for encoding the attribute values, and a one-layer or multi-layer training sub-circuit module for training;

Specifically, the encoding sub-circuit module may include a first parameter-containing quantum logic gate, the first parameter-containing quantum logic gate includes a first tunable parameter, and the number of qubits of the encoding sub-circuit module is the number of attribute values in the group.

Wherein, the parameter-containing quantum logic gate refers to a quantum logic gate in which the unitary matrix contains a tunable parameter. The first parameter-containing quantum logic gate in the encoding sub-circuit module can be a rotating logic gate, such as one or more combinations of RX gates, RY gates, and RZ gates, and the order of the logic gate is not limited, and it specifically includes: RX gates; RY gates; RZ gates; RX gates and RY gates; RX gates and RZ gates; RY gates and RZ gates; RX gates, RY gates and RZ gates. To be clear, the logic gates set on each qubit in the encoding sub-circuit are the same.

With respect to "encoding the group of attribute values into a pre-trained quantum circuit for a convolution operation", it is possible to compute a first tunable parameter value of the first tunable parameter according to the group of attribute values; input the first tunable parameter value into the first parameter-containing quantum logic gate.

Wherein, the first tunable parameter value can be: the arctangent value of the corresponding attribute value or the arctangent value of the square of the attribute value, or it can be computed by a preset formula, e.g., first tunable parameter value=attribute value*π/2 and so on.

Exemplarily, a group of attribute values include four pixel values $x_1, x_2, x_3, x_4$, and the encoding sub-circuit includes 4 qubits, and the first parameter-containing quantum logic gate on each of the qubits is RY gate. The first tunable parameter values in the 4 RY gates are computed, and are respectively: $\theta_1 = x_1 * \pi/2, \theta_2 = x_2 * \pi/2, \theta_3 = x_3 * \pi/2, \theta_4 = x_4 * \pi/2$.

Exemplarily, a group of attribute values are 4 pixel values $x_1, x_2, x_3, x_4$, and the encoding sub-circuit includes 4 qubits, and the first parameter-containing quantum logic gate on each of the qubits is a combination of RY gate and RZ gate. The first tunable parameter values in the 4 RY gates are computed, and are arctangent values arctan $x_1$, arctan $x_2$, arctan $x_3$, arctan $x_4$ of the corresponding attribute values respectively; the first tunable parameter values in the 4 RZ gates are computed, and are arctangent values arctan $x_1^2$, arctan $x_2^2$, arctan $x_3^2$, arctan $x_4^2$ of the square of the corresponding attribute values.

Specifically, the training sub-circuit module includes a second parameter-containing quantum logic gate, which acts on a single qubit, such as an RY gate, etc.; further includes a preset quantum logic gate without a tunable parameter, which act on two qubits, such as CNOT gates acting on two adjacent bits, etc. The second parameter-containing quantum logic gate contains the second tunable parameter determined by training. Moreover, the number of qubits of the training sub-circuit module is the same as the number of qubits of the encoding sub-circuit module, and they are both the number of attribute values of the group. The number of layers of the training sub-circuit module can be set according to the actual application need of convolution operation.

Specifically, the pre-trained quantum circuit can be trained in the following way:
- constructing a quantum circuit comprising an encoding sub-circuit module and a training sub-circuit module;
- receiving a group of attribute values of the attribute information of the training dataset, encoding the group of attribute values identically into the encoding sub-circuit module in the quantum circuit, and initializing the second tunable parameter value in the training sub-circuit module, wherein, the second tunable parameter value can be randomly initialized to be determined, or can be set as a fixed initial value according to the need;
- operating the current quantum line, measuring the current quantum line, and identically determining the convolution result of the group of attribute values based on the measured result;
- comparing the convolution result with a preset desired value, iteratively updating the second parameter value with a training algorithm if the convolution result does not reach the preset desired value, until the determined convolution result reaches the preset desired value, wherein the training algorithm comprises: a gradient descent method, a Newton method, a Quasi-Newton method, or a conjugate gradient method;
- treating the quantum circuit containing the iteratively updated second tunable parameter value as the trained quantum circuit.

S2103, operating the quantum circuit to measure the quantum circuit, and determining the convolution result of the group of attribute values according to the measured result.

In practical applications, it is also possible to continue to receive different sets of attribute values several times, and by repeating the above convolution operation a plurality of times, it is possible to achieve complete coverage of the target data. For example, a group of four pixel values of the image is received, and after the convolution operation is performed, the next group of four pixel values is received again, and the above steps are repeated, and so on, until the convolution operation of all pixels in the image is completed.

Specifically, by measuring the quantum circuit and determining the convolution result of a group of attribute values according to the measured result, it is possible to measure all the qubits of the quantum circuit, thereby obtaining the quantum states of all the qubits and amplitudes thereof; computing the probability corresponding to the amplitude, and computing the convolution result of the group of attribute values according to each quantum state and its probability.

In one implementation, it is possible to accumulate the product of the decimal value (for example, the state corresponds to the decimal value 3) corresponding to each quantum state and the probability, and determine the accumulated sum as the convolution result of the set of attribute values.

In another implementation, it is possible to compute the convolution result of the group of attribute values according to the number of preset substrates in each quantum state and its corresponding probability. For example, the measured result of a 2-qubits is:

|00⟩ state, probability $P_0$; state, probability $P_1$; state, probability $P_2$; state, probability $P_3$. The convolution result is computed as:

$$P_0*(-1)^{n_0}+P_1*(-1)^{n_1}+P_2*(-1)^{n_2}+P_3*(-1)^{n_3}$$

Wherein are the number of a preset sub-state in state, state, state, and state, that is, $n_0=0$、$n_1=1$、$n_2=1$、$n_3=2$, therefore obtaining:

$$P_0-P_1-P_2+P_3$$

In practical applications, measuring the quantum circuit and determining the convolution result of a group of attribute values according to the measured result, or measuring a preset bit of qubit in the quantum circuit, so as to obtain the quantum states of the preset bit of qubit and amplitudes thereof; computing the probability corresponding to the amplitude of the preset quantum state in each quantum state as the convolution result of the group of attribute values. For example, the preset bit of qubit may be 1st qubit, and the preset quantum state may be state of 1st qubit, and so on.

It can be understood by those skilled in the art that, in practical applications, a single convolution operation is capable of extracting some of the implicit feature information in the target object, and the final convolution result of the target object can be extracted through the superposition of multi-layer convolution. Simply based on the coverage of the convolution feature extraction, i.e., the number of input data in the range of the convolution kernel (the number of input attribute values), the quantum convolution operation applies for the same number of qubits (the number of n), constructs the quantum circuit and trains it, and employs the trained quantum circuit to perform the convolution operation on the classical data. It is only necessary to encode the data into a quantum state, and then perform quantum state evolution and measurements via a quantum circuit to obtain a single convolution result. The complexity of the quantum operation can be up to O(log(n)), which improves the efficiency of convolution computation to a great extent.

It can be seen that by receiving a group of attribute values of the attribute information of the target data; encoding the group of attribute values into a pre-trained quantum circuit for a convolution operation; wherein the quantum circuit comprises an encoding sub-circuit module for encoding the attribute values, and a one-layer or multi-layer training sub-circuit module for training; operating the quantum circuit, measuring the quantum circuit, and determining the convolution result of the group of attribute values based on the measured result, it is possible to realize the application of quantum computing in the field of convolutional modeling, so as to take advantage of the parallelism of quantum computing and to complement gaps in related technologies.

Figure 14:
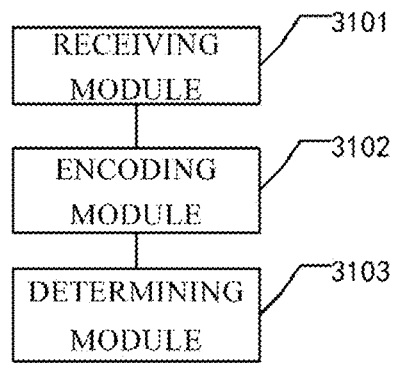
FIG. 14 is a structural schematic diagram of a convolution operation device based on a quantum circuit provided by an embodiment of the present disclosure.

Referring to FIG. 14, FIG. 14 is a structural schematic diagram of a convolution operation device based on quantum circuit provided by an embodiment of the present disclosure, which corresponds to the process shown in FIG. 13, and the device comprises:

a receiving module 3101, configured to receive a group of attribute values of the attribute information of the target data;

an encoding module 3102, configured to encode the group of attribute values into a pre-trained quantum circuit for a convolution operation; wherein the quantum circuit comprises an encoding sub-circuit module for encoding the attribute values, and a one-layer or multi-layer training sub-circuit module for training;

a determining module 3103, configured to operate the quantum circuit to measure the quantum circuit, and determining the convolution result of the group of attribute values according to the measured result.

Specifically, the target data comprises: an image, natural language or audio data.

Specifically, the encoding sub-circuit module comprises a first parameter-containing quantum logic gate which comprises a first tunable parameter;

the encoding module is specifically configured for:
computing a first tunable parameter value of the first tunable parameter according to the group of attribute values;
inputting the first tunable parameter value into the first parameter-containing quantum logic gate.

Specifically, the training sub-circuit module comprises a second tunable parameter for the trained second parameter-containing quantum logic gate, and the number of qubits of the training sub-circuit module is the same as that of the encoding sub-circuit module, which both are the number of the group of attribute values Specifically, the determining module comprises:
measuring unit, configured to measure all qubits of the quantum circuit to obtain each quantum state and their amplitudes of all the qubits;
computing unit, configured to compute the probability corresponding to the amplitude, and computing the convolution result of the group of attribute values according to all the quantum states and their probabilities.

Specifically, the computing unit is specifically configured for:
accumulating the product of the decimal value corresponding to each quantum state and the probability, and determining the accumulated sum as the convolution result of the group of attribute values.

Specifically, the computing unit is specifically configured for:
computing the convolution result of the group of attribute values according to the number of preset substrates in each quantum state and its corresponding probability.

It can be seen that by receiving a group of attribute values of the attribute information of the target data; encoding the group of attribute values into a pre-trained quantum circuit for a convolution operation; wherein the quantum circuit comprises an encoding sub-circuit module for encoding the attribute values, and a one-layer or multi-layer training sub-circuit module for training; operating the quantum circuit, measuring the quantum circuit, and determining the convolution result of the group of attribute values based on the measured result, it is possible to realize the application of quantum computing in the field of convolutional modeling, so as to take advantage of the parallelism of quantum computing and to complement gaps in related technologies.

An embodiment of the present disclosure further provides a storage medium in which a computer program is stored, wherein the computer program is set to execute the steps of any one of the above method embodiments at runtime.

Specifically, in the present embodiment, the storage medium may be set to store a computer program for performing the following steps:

S11, receiving a group of attribute values of the attribute information of the target data;

S12, encoding the group of attribute values into a pre-trained quantum circuit for a convolution operation; wherein the quantum circuit comprises an encoding sub-circuit module for encoding the attribute values, and a one-layer or multi-layer training sub-circuit module for training;

S13, operating the quantum circuit to measure the quantum circuit, and determining the convolution result of the group of attribute values according to the measured result.

Specifically, in the present embodiment, the above storage media may include, but are not limited to: U disk, read-only memory (ROM), random access memory (RAM), portable hard disk, disk or optical disc and other media that can store computer programs.

An embodiment of the present disclosure further provides an electronic device comprising a memory and a processor, the memory is stored with a computer program therein, and the processor is set to run the computer program to execute the steps of any one of the above method embodiments.

Specifically, the above electronic device may further comprise a transmission device and an input-output device, wherein the transmission device is connected to the above processor, and the input-output device is connected to the above processor.

Specifically, in the present embodiment, the above processor may be set to perform the following steps by a computer program:

S11, receiving a group of attribute values of the attribute information of the target data;

S12, encoding the group of attribute values into a pre-trained quantum circuit for a convolution operation; wherein the quantum circuit comprises an encoding sub-circuit module for encoding the attribute values, and a one-layer or multi-layer training sub-circuit module for training;

S13, operating the quantum circuit to measure the quantum circuit, and determining the convolution result of the group of attribute values according to the measured result.

An embodiment of the present disclosure first provides a quantum image recognition method, which can be applied to an electronic device, such as a computer terminal, specifically, an ordinary computer, a quantum computer, etc.

Figure 15:
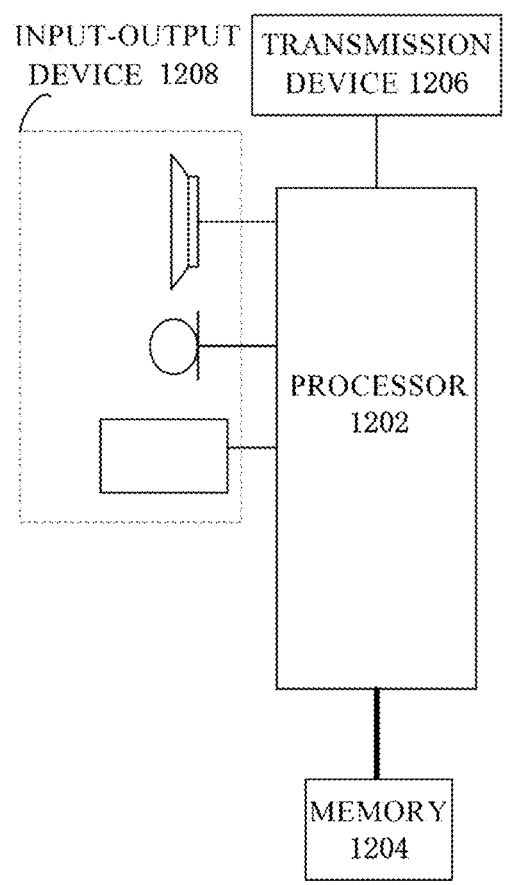
FIG. 15 is a structural block diagram of hardware of a computer terminal based on a quantum image recognition method provided by an embodiment of the present disclosure.

It will be described in detail below by taking running on a computer terminal as an example. FIG. 15 is a structural block diagram of hardware of a computer terminal of a quantum image recognition method provided by an embodiment of the present disclosure. As shown in FIG. 15, the computer terminal may include one or more (only one is shown in FIG. 15) processors 1202 (the processors 1202 may include, but are not limited to, a processing device such as a microprocessor MCU or a programmable logic device FPGA) and a memory 1204 for storing data. Optionally, the above computer terminal may further include a transmission device 1206 and an input-output device 1208 for a communication function. Those skilled in the art can understand that the structure shown in FIG. 15 is only schematic, and does not limit the structure of the computer terminal. For example, the computer terminal may also include more or fewer components than shown in FIG. 15, or have a different configuration than shown in FIG. 15.

The memory 1204 may be used to store a software program as well as a module for application software, such as program instructions/modules corresponding to the quantum image recognition method in embodiments of the present disclosure. The processor 1202 executes various functional applications as well as data processing, i.e., implements the above-described method, by running the software program as well as the module stored in the memory 1204. The memory 1204 may include a high-speed random memory, and may also include a non-volatile memory, such as one or more magnetic storage devices, flash memory, or other non-volatile solid-state memory. In some examples, the memory 1204 may further include memories set remotely relative to the processor 1202, and these remote memories may be connected to the computer terminal via a network. An example of the network includes, but is not limited to, the Internet, an enterprise intranet, a local area network, a mobile communication network, and combinations thereof.

The transmission device 1206 is used to receive or send data via a network. A specific example of the above network may include a wireless network provided by a communications provider of a computer terminal. In one example, the transmission device 1206 includes a Network Interface Controller (NIC) that may be connected to other network devices via a base station so that it may communicate with the Internet. In one example, the transmission device 1206 may be a Radio Frequency (RF) module for communicating wirelessly with the Internet.

It should be noted that a real quantum computer is hybrid in structure and consists of two main parts: a classical computer, which is responsible for performing classical computation and control, and a quantum device, which is responsible for running a quantum program and thus realizing quantum computation. The quantum program is a sequence of instructions written in a quantum language, such as Qrunes, that can be run on the quantum computer, which enables support for a quantum logic gate operation and ultimately quantum computation. Specifically, the quantum program is a sequence of instructions that operates the quantum logic gate in a certain time sequence.

In practical applications, due to the development of hardware of quantum devices, quantum computing simulations are often required to verify quantum algorithms, quantum applications, and so on. Quantum computing simulation refers to the process of using the virtual architecture (that is, quantum virtual machine) built with the resources of ordinary computers to realize the simulation operation of quantum programs corresponding to specific problems. Often, it is necessary to construct quantum programs corresponding to specific problems. The quantum program referred to in the embodiment of the present disclosure is a program written in a classical language characterizing qubits and their evolution, wherein qubits, quantum logic gates, etc. related to quantum computing are represented by corresponding classical codes.

The quantum circuit, as an embodiment of a quantum program, is also known as a quantum logic circuit, is the most commonly used general-purpose quantum computation model, represents a circuit that operates on a qubit in an abstract concept, consists of a qubit, a circuit (a timeline), and a variety of quantum logic gates, and is often required to read out the results of the final quantum measurement operation.

Unlike a conventional circuit where metal wires are connected to transmit a voltage or current signal, in the quantum circuit, the circuit can be viewed as connected by time, i.e., the state of the qubit evolves naturally over time following the instructions of the Hamiltonian operator, until it encounters a logic gate and is operated.

A quantum program as a whole corresponds to a total quantum circuit. The quantum program in this disclosure refers to the total quantum circuit, wherein the total number of qubits in the total quantum circuit is the same as the total number of qubits in the quantum program. It can be understood that a quantum program can be composed of a quantum circuit, measurement operations for the qubits in the quantum circuit, a register for storing the measurement results, and a control flow node (jump instruction). A quantum circuit can contain tens, hundreds or even thousands of quantum logic gate operations. The process of executing a quantum program is the process of executing all quantum logic gates according to a certain time sequence. It should be noted that time sequence is the time sequence in which a single quantum logic gate is executed.

It should be noted that in classical computing, the most basic unit is a bit, and the most basic control mode is a logic gate. The purpose of controlling the circuit can be achieved through the combination of logic gates. Similarly, the way to handle qubits is quantum logic gates. Quantum states can be evolved using quantum logic gates. Quantum logic gates are the basis of quantum circuits, and quantum logic gates include single-bit quantum logic gates, such as Hadamard gate (H gate, Hadamard gate), Pauli-X gate (X gate), Pauli-Y gate (Y gate), Pauli-Z gate (Z gate), RX gate, RY gate, RZ gate, etc.; a double-bit or multi-bit quantum logic gate, such as CNOT gate, CR gate, CZ gate, iSWAP gate, Toffoli gate, etc. Quantum logic gates are generally represented by unitary matrices, and unitary matrices are not only in the form of matrices, but also a kind of operation and transformation. Generally, the function of a quantum logic gate on a quantum state is computed by multiplying the left side of the unitary matrix by the matrix corresponding to the right vector of the quantum state.

Figure 16:
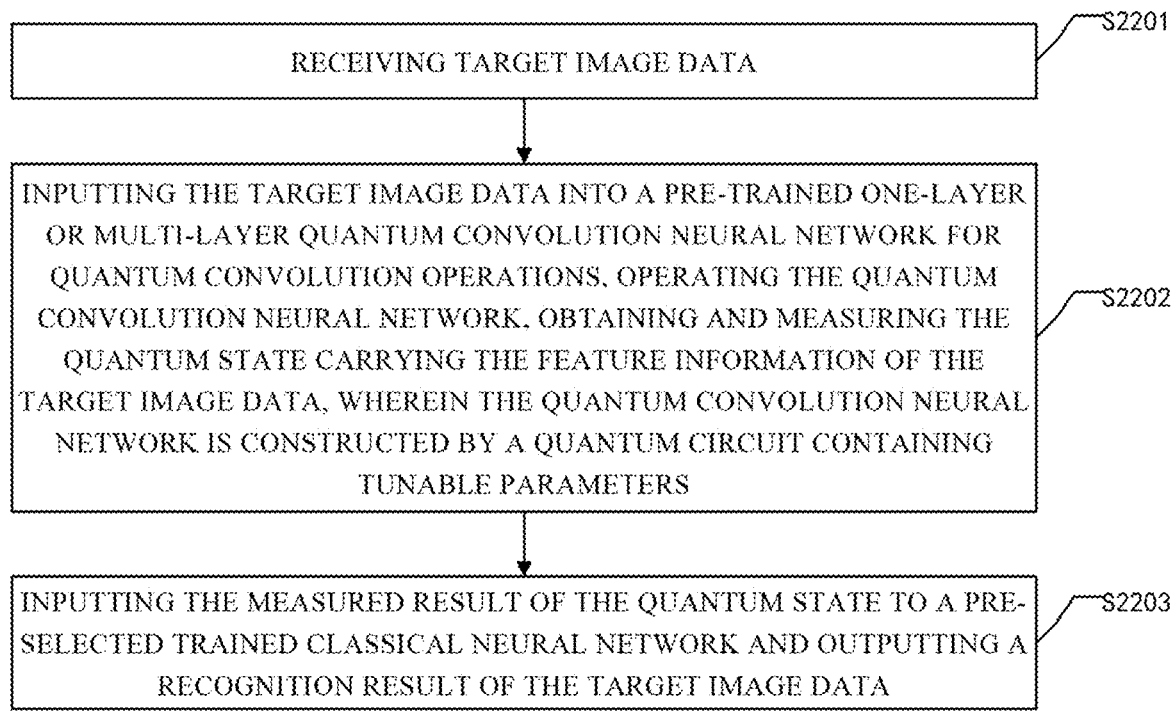
FIG. 16 is a schematic flowchart of a quantum image recognition method provided by an embodiment of the present disclosure.

Referring to FIG. 16, FIG. 16 is a schematic flowchart of an implementation method of quantum convolution operation provided by an embodiment of the present disclosure, which may comprise the following steps:

S2201, receiving target image data;

Specifically, the target image data may include: grayscale image data or color image data.

For example, the received image data is a grayscale image with one channel count, the data dimension size is in the form of a four-dimensional tensor matrix, and the numeric range is a floating-point number between 0 and 1. Assuming that the number of images received is one page of grayscale image with a size of 28*28 and one channel, it has a total of 1*1*28*28=784 pixels; alternatively, assuming that the incoming image data is ten pages of color image with three channels and the image size is 32*32, then there are a total of 10*3*32*32=30720 pixels. With limited computing resources, images can be post-processed in batches.

S2202, inputting the target image data into a pre-trained one-layer or multi-layer quantum convolution neural network for quantum convolution operations, operating the quantum convolution neural network, obtaining and measuring the quantum state carrying the feature information of the target image data, wherein the quantum convolution neural network is constructed by a quantum circuit containing tunable parameters;

Specifically, the quantum convolution neural network may comprise: a quantum state encoding sub-circuit containing a first preset quantum logic gate, a quantum entanglement sub-circuit containing a second preset quantum logic gate, and a quantum convolution kernel sub-circuit containing a third preset quantum logic gate;

Wherein, the quantum state encoding sub-circuit is configured for encoding the pixel information of the target image data onto the quantum state; the quantum entanglement sub sub-circuit is configured for associating the quantum state information of the qubit; the quantum convolution kernel sub-circuit is configured for extracting the feature information corresponding to the pixels carried by quantum state information.

Moreover, the distinction of the preset quantum logic gate is determined by the sub-circuit to which it belongs, and is not divided by the type of quantum logic gate, that is, the quantum logic gate belonging to the quantum state encoding sub-circuit is the first preset quantum logic gate, the quantum logic gate belonging to the quantum entanglement sub-circuit is the second preset quantum logic gate, and the quantum logic gate belonging to the quantum convolution kernel sub-circuit is the third preset quantum logic gate.

It should be noted that if the second preset quantum logic gate is a preset quantum logic gate containing a tunable parameter, the second preset quantum logic gate may be regarded as the first preset quantum logic gate or the third preset quantum logic gate. Wherein, the tunable parameter value of the third preset quantum logic gate may be determined by iterative updating. And, in the one-layer quantum convolution neural network, the number of qubits in the quantum state encoding sub-circuit, the quantum entanglement sub-circuit, and the quantum convolution kernel sub-circuit is the same.

In practical applications, a layer of the quantum convolution neural network may include multiple quantum state encoding sub-circuits, the same multiple quantum entanglement sub-circuits, and the same multiple quantum convolution kernel sub-circuits. The pixels of the target image data can be divided into multiple pieces, the pixel information of each image data is encoded onto the corresponding quantum state encoding sub-circuit, and the number of qubits of each quantum state encoding sub-circuit is the same as that of pixels of each image data. A plurality of quantum state encoding sub-circuits are arranged in parallel (the quantum entanglement sub-circuit and the quantum convolution kernel sub-circuit are the same), one quantum state encoding sub-circuit, one quantum entanglement sub-circuit, and one quantum convolution kernel sub-circuit form part of the quantum convolution neural network to extract part of the image data, that is, the feature information of a single piece of image data.

Specifically, inputting the target image data into pre-trained quantum convolution neural network for quantum convolution operation, it is possible to determine the parameter value to be input of the quantum logic gate (i.e., the first preset quantum logic gate) in the quantum state encoding sub-circuit according to the pixel information of the target image data (specifically, which can be pixel value); inputting the parameter value to be input into the first preset quantum logic gate in the quantum state encoding sub-circuit. Wherein, the first preset quantum logic gate can be any one or more of RX gates, RY gates, or RZ gates, and the first preset quantum logic gate applied to each qubit is the same. In addition, if the second preset quantum logic gate is regarded as the first preset quantum logic gate, the tunable parameter value of the second preset quantum logic gate can also be determined by the pixel value of the target image data.

Figure 17:
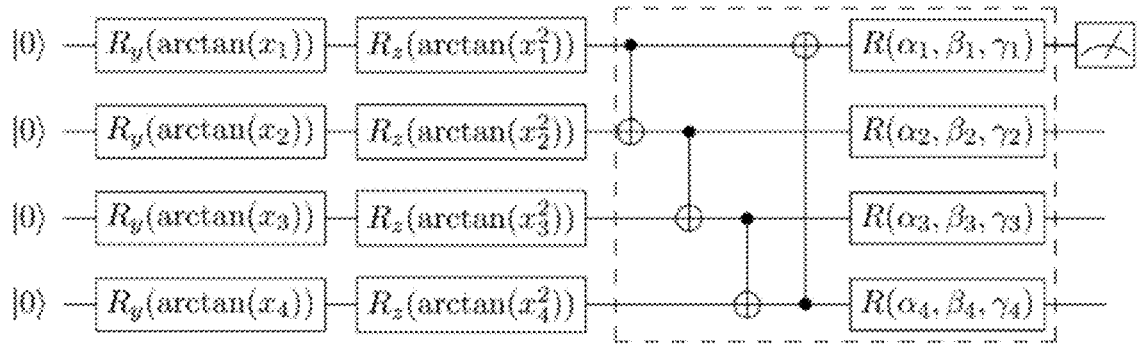
FIG. 17 is a structural schematic diagram of a quantum circuit containing a tunable parameter provided by an embodiment of the present disclosure.

In one implementation, FIG. 17 shows a schematic diagram of a quantum convolution neural network built by a quantum circuit with a tunable parameter, comprising:
four qubits with an initial state of the $|0\rangle$ state, corresponding to four input pixel values;
4 RY gates and 4 RZ gates that make up the quantum state encoding sub-circuit, for a total of 8 first preset quantum logic gates, wherein, parameter values to be input contained in the RY gate can specifically be the arctangent value $\arctan(x_1)$, $\arctan(x_2)$, $\arctan(x_3)$, $\arctan(x_4)$ of four input pixel values $x_1$, $x_2$, $x_3$, $x_4$; the parameter values to be input contained in the RZ gate can specifically be arctangent value $\arctan(x_1^2)$, $\arctan(x_2^2)$, $\arctan(x_3^2)$, of the square of the four input attribute values $x_1$, $x_2$, $x_3$, $x_4$;

In the four second preset quantum logic gates "CNOT gates" that make up the quantum entanglement sub-circuit, and the icon of the CNOT door is indicated by the ⊕ and its connection;

In the four third quantum logical gate "U3 gates" that make up the quantum convolution kernel sub-circuit, each U3 gate contains 3 turnable parameters $\alpha$, $\beta$, $\gamma$. As shown in $R(\alpha_1, \beta_1, \gamma_1)$, $R(\alpha_2, \beta_2, \gamma_2)$, $R(\alpha_3, \beta_3, \gamma_3)$, $R(\alpha_4, \beta_4, \gamma_4)$ of FIG. 17, the corresponding tunable parameter value is determined by iterative updating; and, measurement operations on the 1st qubit located at the end of the circuit; wherein the unitary matrix of the U3 gate is:

$$R(\alpha, \beta, \gamma) = \begin{bmatrix} \cos\left(\frac{\alpha}{2}\right) & -e^{i\gamma} \times \sin\left(\frac{\alpha}{2}\right) \\ e^{i\beta} \times \sin\left(\frac{\alpha}{2}\right) & e^{i\gamma+i\beta} \times \cos\left(\frac{\alpha}{2}\right) \end{bmatrix}$$

Figure 18:
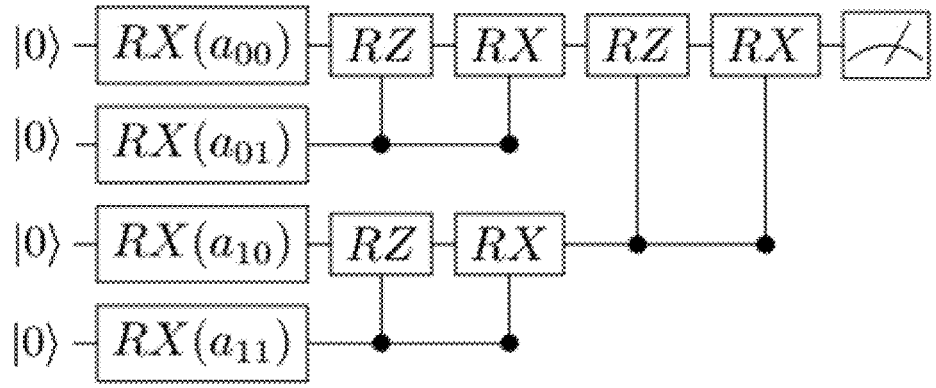
FIG. 18 is a structural schematic diagram of another quantum circuit containing a tunable parameter provided by an embodiment of the present disclosure.

In another implementation, FIG. 18 is a structural schematic diagram of another quantum circuit containing a tunable parameter, which comprises:
four qubits with an initial state of the $|0\rangle$ state;
in the four first preset quantum logic gates RX gates that make up the quantum state encoding sub-circuit, parameter values to be input contained in the RX gate can specifically be arctangent value of four input pixel values $a_{00}$, $a_{01}$, $a_{10}$, $a_{11}$ or the arctangent value of square of the four input pixel values $a_{00}$, $a_{01}$, $a_{10}$, $a_{11}$;

A quantum entanglement-convolution kernel sub-circuit acting as both a quantum entanglement sub-circuit and a quantum convolution kernel sub-circuit, includes three controlled RZ gates and three controlled RX gates, the six preset quantum logic gates are all preset quantum logic gates containing a tunable parameter, and are all regarded as a third preset quantum logic gate here, and the corresponding tunable parameter is determined by iterative updating; and the measurement operation on the 1st qubit at the end of the circuit.

Figure 19:
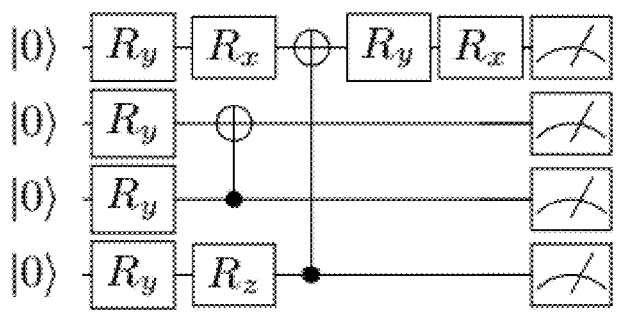
FIG. 19 is structural schematic diagram of yet another quantum circuit containing a tunable parameter provided by an embodiment of the present disclosure.

In another implementation, FIG. 19 is a structural schematic diagram of yet another quantum circuit containing a tunable parameter, which comprises:
four qubits with an initial state of the $|0\rangle$ state;
in the four first preset quantum logic gates RY gates that make up the quantum state encoding sub-circuit, parameter values to be input contained in the RY gate can specifically be arctangent value of four input pixel values;
the four second preset quantum logic gates that make up the quantum entanglement sub-circuit include one RX gate, one RZ gate and two CONT gates, and the RX gate and the RZ gate are preset quantum logic gates containing the tunable parameter and are regarded as the first preset quantum logic gates here, and the corresponding parameter value to be input may be the arctangent value of the input pixel value at the corresponding qubit position;

the two preset quantum logic gates that make up the quantum convolution kernel sub-circuit, includes one RY gate and one RX gate, and the corresponding tunable parameter value is determined by iterative updating; and the measurement operation on all qubit position located at the end of the circuit.

Specifically, "operating the quantum convolution neural network, obtaining and measuring the quantum state carrying the feature information of the target image data", may include the following two situations:

with the quantum convolution neural network being only one layer, operating the quantum state encoding sub-circuit, the quantum entanglement sub-circuit and the quantum convolution kernel sub-circuit in sequence;

measuring preset qubits in the quantum convolution kernel sub-circuit so as to obtain the measured quantum states and their probabilities as the measured result of the quantum convolution neural network.

In practical applications, for multiple quantum convolution kernel sub-circuits, it is possible to measure the quantum states of the preset bit of qubits and their probabilities in each quantum convolution kernel sub-circuit as a measured result of that layer of the quantum convolution neural network. It should be noted that the preset bits of qubits measured correspondingly to each quantum convolution kernel sub-circuit are kept consistent, e.g. they are all first bits or they are all bits.

With the quantum convolution neural network being multi-layer, operating each layer of quantum convolution neural network in sequence, measuring the preset qubits in the quantum convolution kernel sub-circuit in each layer of quantum convolution neural network until obtaining the measured result of last layer of quantum convolution neural network, wherein the next layer of quantum convolution neural network is input depending on the measured result of the previous layer of quantum convolution neural network.

For multi-layer quantum convolution neural network, the number of the quantum state encoding sub-circuits in the next layer of the network is the ratio of the number of the quantum convolution kernel sub-circuits in the previous layer of the network to the number of the qubits in the sub-circuits. For example, the current layer of the network includes sixteen quantum state encoding sub-circuits, sixteen quantum entanglement sub-circuits and sixteen quantum convolution kernel sub-circuits, the number of qubits in each quantum state encoding sub-circuit/quantum entanglement sub-circuit/quantum convolution kernel sub-circuit is four, the next layer of the network includes four quantum state encoding sub-circuits, four quantum entanglement sub-circuits, and four quantum convolution kernel sub-circuits, and the number of qubits in each quantum state encoding sub-circuit/quantum entanglement sub-circuit/quantum convolution kernel sub-circuit is four.

It should be noted that the number of layers of quantum convolution neural network can be set according to the complexity of the specific problem to be solved. For example, for a binary classification problem of image recognition, the problem is relatively simple, and two to three layers of quantum convolution neural network can be used to solve the problem, and for a complex multi-classification problem, it is necessary to deepen the depth of the network and construct a multi-layer quantum convolution network to solve it, and the network depth needs to be determined according to the actual effect.

Specifically, determining input of the next layer of quantum convolution neural network depending on the measured result of the previous layer of quantum convolution neural network, may be that:

measuring the probability of a $|0\rangle$ state or $|1\rangle$ state (assumed to be a $|1\rangle$ state) of 1st qubit in a previous layer of quantum convolution neural networks as parameter values to be input in the next layer of quantum encoding sub-circuits.

For example, the previous layer of eight quantum convolution kernel sub-circuits measures the probability of eight $|1\rangle$ states accordingly and each quantum convolution kernel sub-circuit contains four qubits, then treating probabilities of the first four $|1\rangle$ states as parameter values to be input of one of two quantum state encoding sub-circuits in the next layer, and treating the probabilities of the last $|1\rangle$ states as parameter values to be input of the other one.

Or, it is also possible to treat the quantum states of all qubits in each quantum convolution kernel sub-circuit in the previous layer and their probabilities as the measured result. For example, the decimal value corresponding to each binary quantum state (e.g., $|0011\rangle$, corresponding to decimal 3) is accumulated with the product of the corresponding probabilities, and the sum of the accumulations is used as parameter values to be input of the next layer of quantum encoding sub-circuit.

S2203, inputting the measured result of the quantum state to a pre-selected trained classical neural network and outputting a recognition result of the target image data.

Specifically, it is possible that computing the convolution result of the target image according to the measured result of the quantum convolution neural network; inputting the convolution result into the pre-selected trained classical neural network, and computing a probability corresponding to each image category according to weights of neurons in the classical neural network; outputting the recognition result of the target image according to the probability corresponding to each image category. Wherein, the classical neural network refers to the neural network in the classical computing field, such as fully connected neural networks and so on.

Specifically, it is possible to measure the probability of $|0\rangle$ state or $|1\rangle$ state of preset bit of qubits of each quantum convolution kernel sub-circuit in the last network as the convolution result. Or, measuring the quantum states of all qubits of each quantum convolution kernel sub-circuit in the last network and their probabilities, and accumulating the decimal value corresponding to each binary quantum state with the product of the corresponding probabilities and using the sum of the accumulations as convolution result.

Exemplarily, the last layer of quantum convolution neural network includes four quantum convolution kernel sub-circuits, probabilities of $|1\rangle$ state of 1st qubits of each quantum convolution kernel sub-circuit are computed to be $p_1$, $p_2$, $p_3$, $p_4$ respectively and used as convolution results. Assuming that the image category includes three categories: a cat, a dog and a frog, the classical neural network is a fully connected network, and the weights of neurons are:

the weights of the cat, the dog and the frog corresponding to the first sub-circuit are $W_{11}$, $W_{12}$, and $W_{13}$;

the weights of the cat, the dog and the frog corresponding to the second sub-circuit are $W_{21}$, $W_{22}$, and $W_{23}$;

the weights of the cat, the dog and the frog corresponding to the third sub-circuit are $W_{31}$, $W_{32}$, $W_{33}$;

the weights of the cat, the dog and the frog corresponding to the fourth sub-circuit are $W_{41}$, $W_{42}$, $W_{43}$;

the recognition probability corresponding to each image category is computed as:
probability of recognizing the image as the cat: $p_1*w_{11}+p_2*w_{21}+p_3*w_{31}+p_4*w_{41}$;
probability of recognizing the image as the dog: $p_1*w_{12}+p_2*w_{22}+p_3*w_{32}+p_4*w_{42}$;
probability of recognizing the image as the frog: $p_1*w_{12}+p_2*w_{22}+p_3*w_{32}+p_4*w_{42}$;
Finally, the image category with the highest recognition probability can be output as the recognition result of the target image data. Or, multiple or even all probabilities and their corresponding image categories can be output in sequence, which are sorted by probability and serve as the recognition result of the target image data. For example, the recognition result is:
cat: 87%; dog: 11%; frog: 2%.

In practical applications, through the measurement of the relevant bits of the quantum convolution neural network and the classical neural network, it is possible to output the computed recognition result, compare the recognition result with the real result to build a loss function, and iteratively update the gradient of the tunable parameters in the quantum convolution neural network through the loss function, thereby completing the training of the quantum convolution neural network.

For classification problems of image recognition, the cross-entropy loss function can be used, and the formula is as follows:

$$L(p,q)=-\Sigma_{i=1}^{n}p(y_i)\log(q(y_i))$$

Wherein, n is the number of image categories, $y_i$ represents the ith image category, for example, $y_1$, $y_2$, $y_3$ represents the cat, the dog and the frog, $p(y_i)$ represents the true label probability distribution of categorical data, and $q(y_i)$ represents the predicted label probability distribution of categorical data.

The gradient of the tunable parameter can be computed as follows:

$$\nabla_{\theta_i} f(x; \theta_i) = \frac{1}{2}\left[f\left(x; \theta_i + \frac{\pi}{2}\right) - f\left(x; \theta_i - \frac{\pi}{2}\right)\right]$$

Wherein, $f(x; \theta_i)$ can be understood as the quantum convolution function corresponding to the quantum convolution neural network, specifically the probability value measured by the quantum convolution neural network when the current input is x (pixel value) and $\theta_i$ (tunable parameter), x is the input pixel value, and $\theta_i$ is the current tunable parameter of the quantum logic gate, and $\nabla_{\theta_i}$ is the gradient.

The tunable parameter can be updated as follows:

$$\theta_i \leftarrow \theta_i - \eta \nabla_{\theta_i} L$$

Wherein, $\eta$ is the learning rate, the value of which is determined mainly based on the iterative convergence of the network, e.g., 1e-3. If it does not converge or converges too fast, for example, if it has converged after 3 rounds of training, it means that the value is too large, which requires a relative reduction of its value; if the convergence is slow, for example, after 30 rounds of training, it still has not converged, which means that the value is too small and needs to be adjusted relatively large.

It can be seen that by receiving target image data, receiving target image data, inputting the target image data into a pre-trained one-layer or multi-layer quantum convolution neural network for quantum convolution operations, operating the quantum convolution neural network, obtaining and measuring the quantum state carrying the feature information of the target image data, wherein the quantum convolution neural network is constructed by a quantum circuit containing tunable parameters; then, inputting the measured result of the quantum state to a pre-selected trained classical neural network and outputting a recognition result of the target image data, therefore realizing the application of quantum computing in the field of convolution neural network, so as to take advantage of the parallelism of quantum computing and to complement gaps in related technologies.

Figure 20:
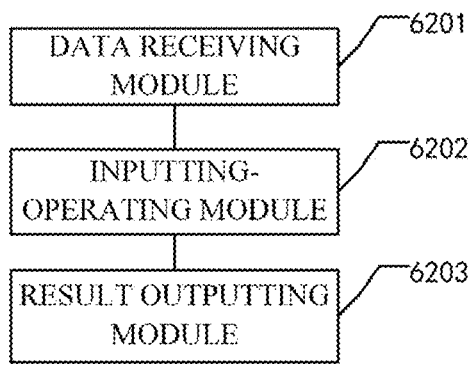
FIG. 20 is a structural schematic diagram of a quantum image recognition device provided by an embodiment of the present disclosure.

Referring to FIG. 20, FIG. 20 is a structural schematic diagram of a quantum image recognition device provided by an embodiment of the present disclosure, which corresponds to the process shown in FIG. 16, and the device comprises:
a data receiving module 6201, configured to receive target image data;
an inputting-operating module 6202, configured to input the target image data into a pre-trained one-layer or multi-layer quantum convolution neural network for quantum convolution operations, operating the quantum convolution neural network, obtaining. and measuring the quantum state carrying the feature information of the target image data, wherein the quantum convolution neural network is constructed by a quantum circuit containing tunable parameters;
a result outputting module 6203, configured to input the measured result of the quantum state to a pre-selected trained classical neural network and outputting a recognition result of the target image data.

Specifically, The target image data comprises: grayscale image data or color image data.

Specifically, the quantum convolution neural network comprises: a quantum state encoding sub-circuit, a quantum entanglement sub-circuit and a quantum convolution kernel sub-circuit; Wherein,
the quantum state encoding sub-circuit is configured to encode the pixel information of the target image data onto the quantum state;
the quantum entanglement sub-circuit is configured to associate quantum state information of different qubits;
the quantum convolution kernel sub-circuit is configured to extract the feature information corresponding to the pixels carried by quantum state information.

Specifically, the inputting-operating module is specifically configured for
determining the parameter value to be input of the quantum logic gate in the quantum state encoding sub-circuit according to the pixel information of the target image data;
inputting the parameter value to be input into the quantum state encoding sub-circuit.

Specifically, the inputting-operating module is specifically configured for
operating the quantum state encoding sub-circuit, the quantum entanglement sub-circuit, and the quantum convolution kernel sub-circuit successively under the condition that one-layer or multi-layer quantum convolution neural network is one layer;
measuring a preset qubits in the quantum convolution kernel sub-circuit so as to obtain the measured individual quantum states and their probabilities to be used as the measured result of the quantum convolution neural network;
operating each layer of quantum convolution neural network successively under the condition that one-layer or multi-layer quantum convolution neural network is multi-layer, measuring the preset qubits in the quantum convolution kernel sub-circuit in each layer of quantum convolution neural network until obtaining the measured result of last layer of quantum convolution neural network, wherein the next layer of quantum convolution neural network is input depending on the measured result of the previous layer of quantum convolution neural network.

Specifically, the result outputting module is specifically configured for:

computing a convolution result of the target image data according to the measured result of the quantum convolution neural network;

inputting the convolution result into the pre-selected trained classical neural network, and computing a probability corresponding to each image category according to weights of neurons in the classical neural network;

outputting a recognition result of the target image data according to probability corresponding to each image category.

It can be seen that by receiving target image data, receiving target image data, inputting the target image data into a pre-trained one-layer or multi-layer quantum convolution neural network for quantum convolution operations, operating the quantum convolution neural network, obtaining and measuring the quantum state carrying the feature information of the target image data, wherein the quantum convolution neural network is constructed by a quantum circuit containing tunable parameters; then, inputting the measured result of the quantum state to a pre-selected trained classical neural network and outputting a recognition result of the target image data, therefore realizing the application of quantum computing in the field of convolution neural network, so as to take advantage of the parallelism of quantum computing and to complement gaps in related technologies.

An embodiment of the present disclosure further provides a storage medium in which a computer program is stored, wherein the computer program is set to execute the steps of any one of the above method embodiments at runtime.

Specifically, in the present embodiment, the storage medium may be set to store a computer program for performing the following steps:

S21, receiving target image data;

S22, inputting the target image data into a pre-trained one-layer or multi-layer quantum convolution neural network for quantum convolution operations, operating the quantum convolution neural network, obtaining and measuring the quantum state carrying the feature information of the target image data, wherein the quantum convolution neural network is constructed by a quantum circuit containing tunable parameters;

S23, inputting the measured result of the quantum state to a pre-selected trained classical neural network and outputting a recognition result of the target image data.

Specifically, in the present embodiment, the above storage media may include, but are not limited to: U disk, read-only memory (ROM), random access memory (RAM), portable hard disk, disk or optical disc and other media that can store computer programs.

An embodiment of the present disclosure further provides an electronic device comprising a memory and a processor, the memory is stored with a computer program therein, and the processor is set to run the computer program to execute the steps of any one of the above method embodiments.

Specifically, the above electronic device may further comprise a transmission device and an input-output device, wherein the transmission device is connected to the above processor, and the input-output device is connected to the above processor.

Specifically, in the present embodiment, the above processor may be set to perform the following steps by a computer program:

S21, receiving target image data;

S22, inputting the target image data into a pre-trained one-layer or multi-layer quantum convolution neural network for quantum convolution operations, operating the quantum convolution neural network, obtaining and measuring the quantum state carrying the feature information of the target image data, wherein the quantum convolution neural network is constructed by a quantum circuit containing tunable parameters;

S23, inputting the measured result of the quantum state to a pre-selected trained classical neural network and outputting a recognition result of the target image data.

An embodiment of the present disclosure provides a display method for quantum image recognition, which can be applied to an electronic device, such as a computer terminal, specifically, an ordinary computer, a quantum computer, etc.

Figure 21:
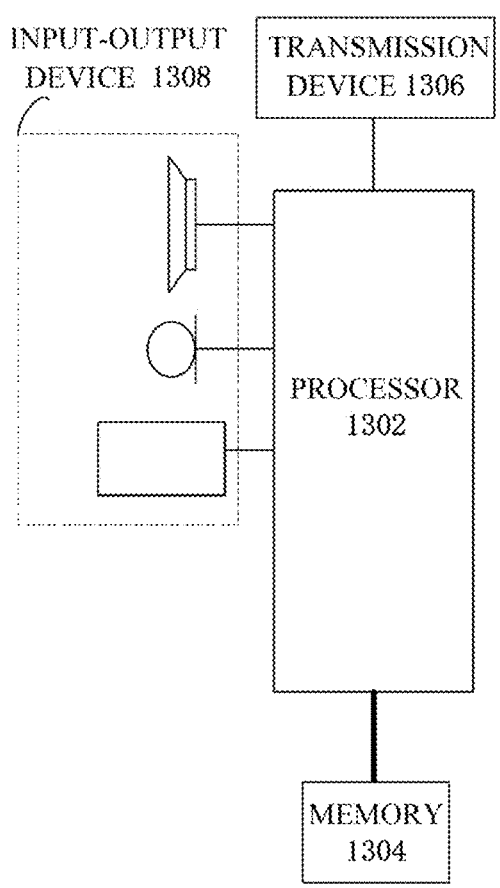
FIG. 21 is a structural block diagram of hardware of a computer terminal based on a display method for quantum image recognition provided by an embodiment of the present disclosure.

It will be described in detail below by taking running on a computer terminal as an example. FIG. 21 is a structural block diagram of hardware of a computer terminal based on the display method for quantum image recognition provided by an embodiment of the present disclosure. As shown in FIG. 21, the computer terminal may include one or more (only one is shown in FIG. 21) processors 1302 (the processors 1302 may include, but are not limited to, a processing device such as a microprocessor MCU or a programmable logic device FPGA) and a memory 1304 for storing data. Optionally, the above computer terminal may further include a transmission device 1306 and an input-output device 1308 for a communication function. Those skilled in the art can understand that the structure shown in FIG. 21 is only schematic, and does not limit the structure of the computer terminal. For example, the computer terminal may also include more or fewer components than shown in FIG. 21, or have a different configuration than shown in FIG. 21.

The memory 1304 may be used to store a software program as well as a module for application software, such as program instructions/modules corresponding to the display method for quantum image recognition in embodiments of the present disclosure. The processor 1302 executes various functional applications as well as data processing, i.e., implements the above-described method, by running the software program as well as the module stored in the memory 1304. The memory 1304 may include a high-speed random memory, and may also include a non-volatile memory, such as one or more magnetic storage devices, flash memory, or other non-volatile solid-state memory. In some examples, the memory 1304 may further include memories set remotely relative to the processor 1302, and these remote memories may be connected to the computer terminal via a network. An example of the network includes, but is not limited to, the Internet, an enterprise intranet, a local area network, a mobile communication network, and combinations thereof.

The transmission device 1306 is used to receive or send data via a network. A specific example of the above network may include a wireless network provided by a communications provider of a computer terminal. In one example, the transmission device 1306 includes a Network Interface Controller (NIC) that may be connected to other network devices via a base station so that it may communicate with the Internet. In one example, the transmission device 1306 may be a Radio Frequency (RF) module for communicating wirelessly with the Internet.

It should be noted that a real quantum computer is hybrid in structure and consists of two main parts: a classical computer, which is responsible for performing classical computation and control, and a quantum device, which is responsible for running a quantum program and thus realizing quantum computation. The quantum program is a sequence of instructions written in a quantum language, such as QRunes, that can be run on the quantum computer, which enables support for a quantum logic gate operation and ultimately quantum computation. Specifically, the quantum program is a sequence of instructions that operates the quantum logic gate in a certain time sequence.

In practical applications, due to the development of hardware of quantum devices, quantum computing simulations are often required to verify quantum algorithms, quantum applications, and so on. Quantum computing simulation refers to the process of using the virtual architecture (that is, quantum virtual machine) built with the resources of ordinary computers to realize the simulation operation of quantum programs corresponding to specific problems. Often, it is necessary to construct quantum programs corresponding to specific problems. The quantum program referred to in the embodiment of the present disclosure is a program written in a classical language characterizing qubits and their evolution, wherein qubits, quantum logic gates, etc. related to quantum computing are represented by corresponding classical codes.

The quantum circuit, as an embodiment of a quantum program, is also known as a quantum logic circuit, is the most commonly used general-purpose quantum computation model, represents a circuit that operates on a qubit in an abstract concept, consists of a qubit, a circuit (a timeline), and a variety of quantum logic gates, and is often required to read out the results of the final quantum measurement operation.

Unlike a conventional circuit where metal wires are connected to transmit a voltage or current signal, in the quantum circuit, the circuit can be viewed as connected by time, i.e., the state of the qubit evolves naturally over time following the instructions of the Hamiltonian operator, until it encounters a logic gate and is operated.

A quantum program as a whole corresponds to a total quantum circuit. The quantum program in this disclosure refers to the total quantum circuit, wherein the total number of qubits in the total quantum circuit is the same as the total number of qubits in the quantum program. It can be understood that a quantum program can be composed of a quantum circuit, measurement operations for the qubits in the quantum circuit, a register for storing the measurement results, and a control flow node (jump instruction). A quantum circuit can contain tens, hundreds or even thousands of quantum logic gate operations. The process of executing a quantum program is the process of executing all quantum logic gates according to a certain time sequence. It should be noted that time sequence is the time sequence in which a single quantum logic gate is executed.

It should be noted that in classical computing, the most basic unit is a bit, and the most basic control mode is a logic gate. The purpose of controlling the circuit can be achieved through the combination of logic gates. Similarly, the way to handle qubits is quantum logic gates. Quantum states can be evolved using quantum logic gates. Quantum logic gates are the basis of quantum circuits, and quantum logic gates include single-bit quantum logic gates, such as Hadamard gate (H gate, Hadamard gate), Pauli-X gate (X gate), Pauli-Y gate (Y gate), Pauli-Z gate (Z gate), RX gate, RY gate, RZ gate, etc.; a double-bit or multi-bit quantum logic gate, such as CNOT gate, CR gate, CZ gate, iSWAP gate, Toffoli gate, etc. Quantum logic gates are generally represented by unitary matrices, and unitary matrices are not only in the form of matrices, but also a kind of operation and transformation. Generally, the function of a quantum logic gate on a quantum state is computed by multiplying the left side of the unitary matrix by the matrix corresponding to the right vector of the quantum state.

Figure 22:
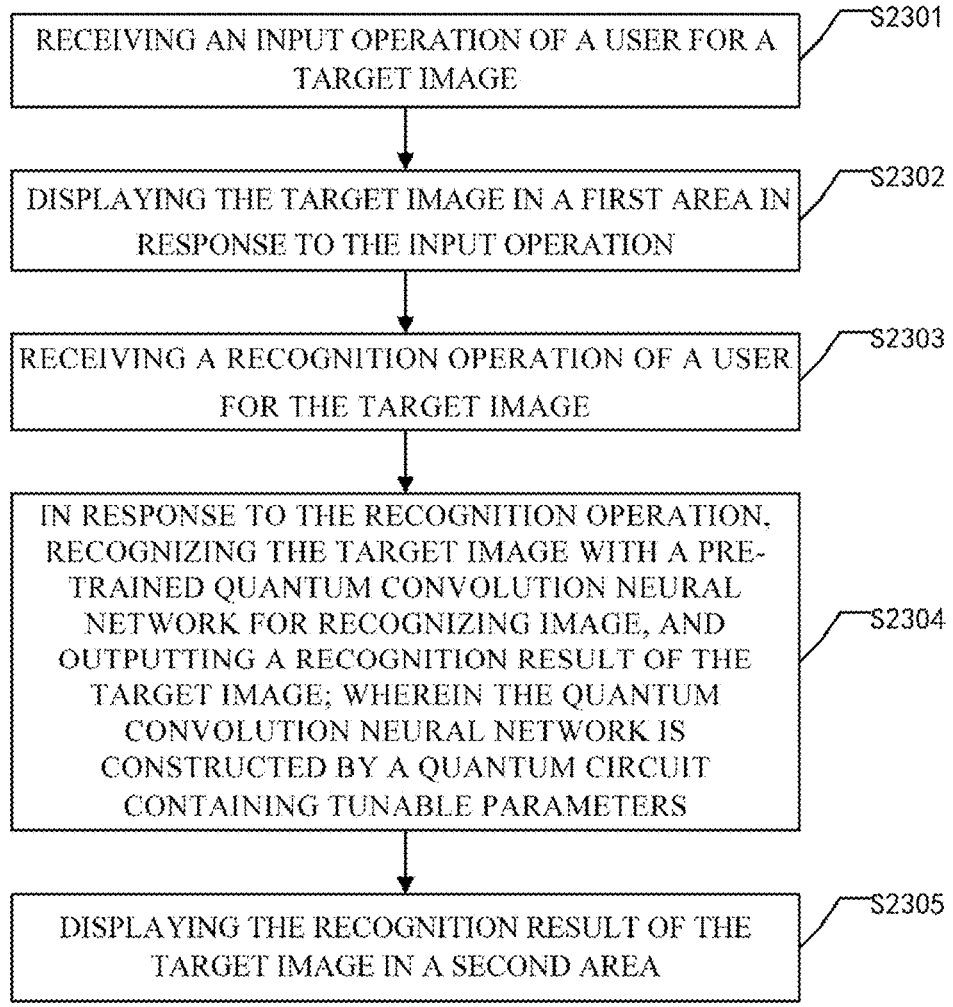
FIG. 22 is a schematic flowchart of a display method for quantum image recognition provided by an embodiment of the present disclosure.

Referring to FIG. 22, FIG. 22 is a schematic flowchart of a display method for quantum image recognition provided by an embodiment of the present disclosure, which comprises the following steps:

S2301, receiving an input operation of a user for a target image;

Exemplarily, a plurality of random exemplary image can be displayed on the terminal interface to form an image set, and the input operation of the user aiming at the target image can be the clicking operation of an image to be identified in the image set. In addition, the user can trigger the image update function operation in the terminal interface to update the image set. Alternatively, the input operation may be an upload operation for a local image, or the like.

S2302, displaying the target image in a first area in response to the input operation;

Specifically, the target image may be separately displayed in the first area of the terminal interface.

Wherein, the target image (picture) may include: grayscale image data or color image data. For example, the received image data is a grayscale image with one channel count, the data dimension size is in the form of a four-dimensional tensor matrix, and the numeric range is a floating-point number between 0 and 1. Assuming that the number of images received is one page of grayscale image with a size of 28*28 and one channel, it has a total of 1*1*28*28=784 pixels; assuming that the incoming image data is one page of color image with three channels and the image size is 32*32, then there are a total of 10*3*32*32=30720 pixels.

S2303, receiving a recognition operation of a user for the target image;

Exemplarily, it is possible to receive user's click on the recognition function button in the terminal interface, and start the recognition of the target image through the click operation.

S2304, in response to the recognition operation, recognizing the target image with a pre-trained quantum convolution neural network for recognizing image, and outputting a recognition result of the target image; wherein the quantum convolution neural network is constructed by a quantum circuit containing tunable parameters;

Wherein, quantum convolution neural network refers to the convolution neural network used in the field of quantum computing, corresponding to the convolution neural network in the field of classical computing, which can be understood as the quantum version corresponding to the classical convolution neural network, and can be used for image recognition through training.

Specifically, in one implementation, recognizing the target image through the pre-trained quantum convolution neural network for image recognition and outputting the recognition result of the target image, may comprises:

S23041: inputting the target image into a pre-trained one-layer or multi-layer quantum convolution neural network for quantum convolution operation, operating the quantum convolution neural network, and obtaining and measuring a quantum state carrying feature information of the target image;

With regards to the quantum convolution neural network provided by the present disclosure, it can be understood as a quantum circuit containing a tunable parameter, which may specifically include: a quantum state encoding sub-circuit containing a first preset quantum logic gate, a quantum entanglement sub-circuit containing a second preset quantum logic gate, and a quantum convolution kernel sub-circuit containing a third preset quantum logic gate;

Wherein, the quantum state encoding sub-circuit is configured for encoding the pixel information of the target image onto the quantum state; the quantum entanglement sub sub-circuit is configured for associating the quantum state information of the quantum bit; the quantum convolution kernel sub-circuit is configured for extracting the feature information corresponding to the pixels carried by quantum state information.

Moreover, the distinction of the preset quantum logic gate is determined by the sub-circuit to which it belongs, and is not divided by the type of quantum logic gate, that is, the quantum logic gate belonging to the quantum state encoding sub-circuit is the first preset quantum logic gate, the quantum logic gate belonging to the quantum entanglement sub-circuit is the second preset quantum logic gate, and the quantum logic gate belonging to the quantum convolution kernel sub-circuit is the third preset quantum logic gate.

It should be noted that if the second preset quantum logic gate is a preset quantum logic gate containing a tunable parameter, the second preset quantum logic gate may be regarded as the first preset quantum logic gate or the third preset quantum logic gate. Therefore, the tunable parameter value of the third preset quantum logic gate can be determined by iterative updating (i.e., training). And, in the one-layer of quantum convolution neural network, the number of qubits in the quantum state encoding sub-circuit, the quantum entanglement sub-circuit, and the quantum convolution kernel sub-circuit is the same.

In practical applications, a layer of a quantum convolution neural network can include multiple quantum state encoding sub-circuits, the same multiple quantum entanglement sub-circuits, and the same multiple quantum convolution kernel sub-circuits. The pixels of the target image can be divided into multiple pieces, and the pixel information of each image data can be encoded on the corresponding quantum state encoding sub-circuit, and the number of qubits of each quantum state encoding sub-circuit is the same as the number of pixels of each image data. A plurality of quantum state encoding sub-circuits are arranged in parallel (the quantum entanglement sub-circuit and the quantum convolution kernel sub-circuit are the same), wherein, one quantum state encoding sub-circuit, one quantum entanglement sub-circuit, and one quantum convolution kernel sub-circuit form part of the quantum convolution neural network to extract part of the image data, that is, the feature information of a single piece of image data.

Specifically, inputting the target image into pre-trained quantum convolution neural network for quantum convolution operation, it is possible to determine the parameter value to be input of the quantum logic gate (i.e., the first preset quantum logic gate) in the quantum state encoding sub-circuit according to the pixel information of the target image (specifically, which can be pixel value); inputting the parameter value to be input into the first preset quantum logic gate in the quantum state encoding sub-circuit. Wherein, the first preset quantum logic gate can be any one or more of RX gates, RY gates, or RZ gates, and the first preset quantum logic gate applied to each qubit is the same. In addition, if the second preset quantum logic gate is regarded as the first preset quantum logic gate, the tunable parameter value of the second preset quantum logic gate can also be determined by the pixel value of the target image.

Figure 23:
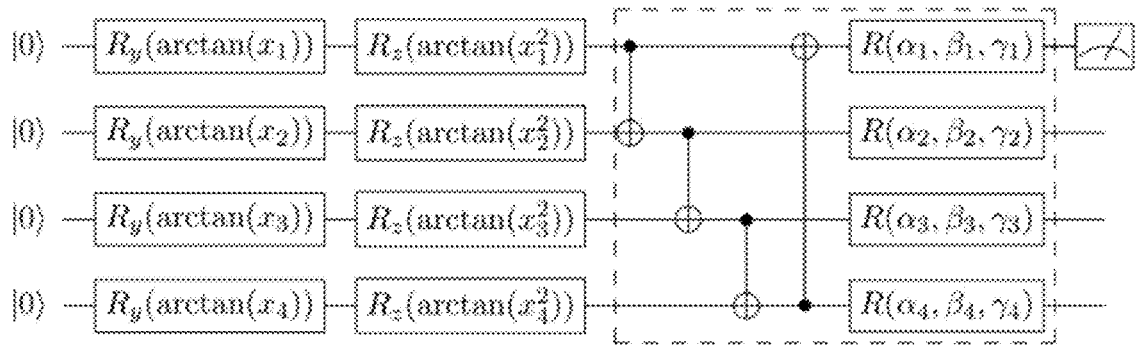
FIG. 23 is a structural schematic diagram of a quantum circuit containing a tunable parameter provided by an embodiment of the present disclosure.

In one implementation, FIG. 23 shows a schematic diagram of a quantum convolution neural network built by a quantum circuit with a tunable parameter, comprising:

four qubits with an initial state of the $|0\rangle$ state, corresponding to four input pixel values;

4 RY gates and 4 RZ gates that make up the quantum state encoding sub-circuit, for a total of 8 first preset quantum logic gates, wherein, parameter values to be input contained in the RY gate can specifically be the arctangent value $\arctan(x_1)$, $\arctan(x_2)$, $\arctan(x_3)$, $\arctan(x_4)$ of four input pixel values $x_1$, $x_2$, $x_3$, $x_4$; the parameter values to be input contained in the RZ gate can specifically be arctangent value $\arctan(x_1^2)$, $\arctan(x_2^2)$, $\arctan(x_3^2)$, of the square of the four input attribute values $x_1$, $x_2$, $x_3$, $x_4$;

In the four second preset quantum logic gates "CNOT gates" that make up the quantum entanglement sub-circuit, and the icon of the CNOT door is indicated by the $\oplus$ and its connection;

In the four third quantum logical gate "U3 gates" that make up the quantum convolution kernal sub-circuit, each U3 gate contains 3 tunable parameters $\alpha$, $\beta$, $\gamma$. As shown in $R(\alpha_1, \beta_1, \gamma_1)$, $R(\alpha_2, \beta_2, \gamma_2)$, $R(\alpha_3, \beta_3, \gamma_3)$, $R(\alpha_4, \beta_4, \gamma_4)$ of FIG. 23, the corresponding tunable parameter value is determined by iterative updating; and, measurement operations on the 1st qubit located at the end of the circuit; wherein the unitary matrix of the U3 gate is:

$$R(\alpha, \beta, \gamma) = \begin{bmatrix} \cos\left(\frac{\alpha}{2}\right) & -e^{i\gamma} \times \sin\left(\frac{\alpha}{2}\right) \\ e^{i\beta} \times \sin\left(\frac{\alpha}{2}\right) & e^{i\gamma+i\beta} \times \cos\left(\frac{\alpha}{2}\right) \end{bmatrix}$$

Figure 24:
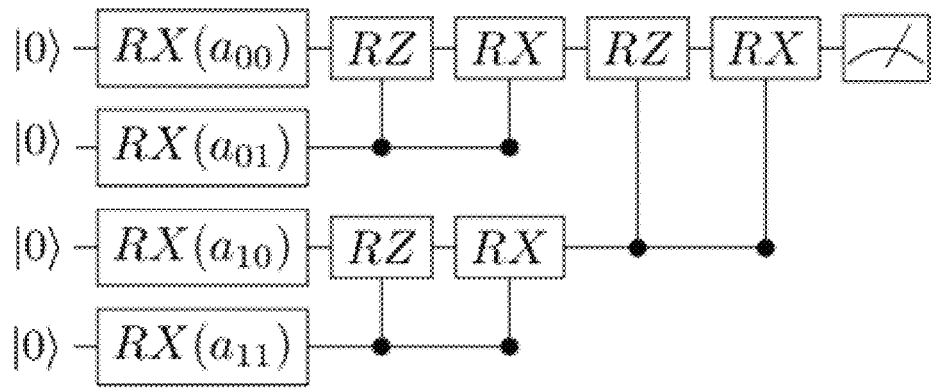
FIG. 24 is a structural schematic diagram of another quantum circuit containing a tunable parameter provided by an embodiment of the present disclosure.

In another implementation, FIG. 24 is a structural schematic diagram of another quantum circuit containing a tunable parameter, which comprises:

four qubits with an initial state of the $|0\rangle$ state;

in the four first preset quantum logic gates RX gates that make up the quantum state encoding sub-circuit, parameter values to be input contained in the RX gate can specifically be arctangent value of four input pixel values $a_{00}$, $a_{01}$, $a_{10}$, $a_{11}$ or the arctangent value of square of the four input pixel values $a_{00}$, $a_{01}$, $a_{10}$, $a_{11}$;

A quantum entanglement-convolution kernel sub-circuit acting as both a quantum entanglement sub-circuit and a quantum convolution kernel sub-circuit, includes three controlled RZ gates and three controlled RX gates, the six preset quantum logic gates are all preset quantum logic gates containing a tunable parameter, and are all regarded as a third preset quantum logic gate here, and the corresponding tunable parameter is determined by iterative updating; and the measurement operation on the 1st qubit at the end of the circuit.

Figure 25:
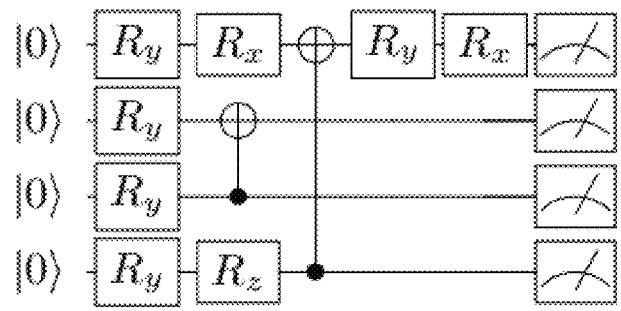
FIG. 25 is a structural schematic diagram of yet another quantum circuit containing a tunable parameter provided by an embodiment of the present disclosure.

In another implementation, FIG. 25 is a structural schematic diagram of yet another quantum circuit containing a tunable parameter, which comprises:

four qubits with an initial state of the $|0\rangle$ state;

in the four first preset quantum logic gates RY gates that make up the quantum state encoding sub-circuit, parameter values to be input contained in the RY gate can specifically be arctangent value of four input pixel values;

the four second preset quantum logic gates that make up the quantum entanglement sub-circuit include one RX gate, one RZ gate and two CONT gates, and the RX gate and the RZ gate are preset quantum logic gates containing the tunable parameter and are regarded as the first preset quantum logic gates here, and the corresponding parameter value to be input may be the arctangent value of the input pixel value at the corresponding qubit position;

the two preset quantum logic gates that make up the quantum convolution kernel sub-circuit, includes one RY gate and one RX gate, and the corresponding tunable parameter value is determined by iterative updating; and the measurement operation on all qubit position located at the end of the circuit.

Specifically, "operating the quantum convolution neural network, obtaining and measuring the quantum state carrying the feature information of the target image data", may include the following two situations:

with the quantum convolution neural network being only one layer, operating the quantum state encoding sub-circuit, the quantum entanglement sub-circuit and the quantum convolution kernel sub-circuit in sequence;

measuring preset qubits in the quantum convolution kernel sub-circuit so as to obtain the measured quantum states and their probabilities as the measured result of the quantum convolution neural network.

In practical applications, for multiple quantum convolution kernel sub-circuits, it is possible to measure the quantum states of the preset bit of qubits and their probabilities in each quantum convolution kernel sub-circuit as a measured result of that layer of the quantum convolution neural network. It should be noted that the preset bits of qubits measured correspondingly to each quantum convolution kernel sub-circuit are kept consistent, e.g. they are all first bits or they are all bits.

With the quantum convolution neural network being multi-layer, operating each layer of quantum convolution neural network in sequence, measuring the preset qubits in the quantum convolution kernel sub-circuit in each layer of quantum convolution neural network until obtaining the measured result of last layer of quantum convolution neural network, wherein the next layer of quantum convolution neural network is input depending on the measured result of the previous layer of quantum convolution neural network.

For multi-layer quantum convolution neural network, the number of the quantum state encoding sub-circuits in the next layer of the network is the ratio of the number of the quantum convolution kernel sub-circuits in the previous layer of the network to the number of the qubits in the sub-circuits. For example, the current layer of the network includes sixteen quantum state encoding sub-circuits, sixteen quantum entanglement sub-circuits and sixteen quantum convolution kernel sub-circuits, the number of qubits in each quantum state encoding sub-circuit/quantum entanglement sub-circuit/quantum convolution kernel sub-circuit is four, the next layer of the network includes four quantum state encoding sub-circuits, four quantum entanglement sub-circuits, and four quantum convolution kernel sub-circuits, and the number of qubits in each quantum state encoding sub-circuit/quantum entanglement sub-circuit/quantum convolution kernel sub-circuit is four.

It should be noted that the number of layers of quantum convolution neural network can be set according to the complexity of the specific problem to be solved. For example, for a binary classification problem of image recognition, the problem is relatively simple, and two to three layers of quantum convolution neural network can be used to solve the problem, and for a complex multi-classification problem, it is necessary to deepen the depth of the network and construct a multi-layer quantum convolution network to solve it, and the network depth needs to be determined according to the actual effect.

Specifically, determining input of the next layer of quantum convolution neural network depending on the measured result of the previous layer of quantum convolution neural network, may be that:

measuring the probability of a |0⟩ state or |1⟩ state (assumed to be a |1⟩ state) of 1st qubit in a previous layer of quantum convolution neural networks as parameter values to be input in the next layer of quantum encoding sub-circuits.

For example, the previous layer of eight quantum convolution kernel sub-circuits measure the probability of eight |1⟩ states accordingly and each quantum convolution kernel sub-circuit contains four qubits, then treating probabilities of the first four |1⟩ states as parameter values to be input of one of two quantum state encoding sub-circuits in the next layer, and treating the probabilities of the last |1⟩ states as parameter values to be input of the other one.

Or, it is also possible to treat the quantum states of all qubits in each quantum convolution kernel sub-circuit in the previous layer and their probabilities as the measured result. For example, the decimal value corresponding to each binary quantum state (e.g., |0011⟩, corresponding to decimal 3) is accumulated with the product of the corresponding probabilities, and the sum of the accumulations is used as parameter values to be input of the next layer of quantum encoding sub-circuit.

S23042: inputting a measured result of the quantum state into the pre-selected trained classical neural network, and outputting a recognition result of the target image.

Specifically, it is possible that computing the convolution result of the target image according to the measured result of the quantum convolution neural network; inputting the convolution result into the pre-selected trained classical neural network, and computing a probability corresponding to each image category according to weights of neurons in the classical neural network; outputting the recognition result of the target image according to the probability corresponding to each image category. Wherein, the classical neural network refers to the neural network in the classical computing field, such as fully connected neural networks and so on.

Specifically, it is possible to measure the probability of |0⟩ state or |1⟩ state of preset bit of qubits of each quantum convolution kernel sub-circuit in the last network as the convolution result. Or, measuring the quantum states of all qubits of each quantum convolution kernel sub-circuit in the last network and their probabilities, and accumulating the decimal value corresponding to each binary quantum state with the product of the corresponding probabilities and using the sum of the accumulations as convolution result.

Exemplarily, the last layer of quantum convolution neural network includes four quantum convolution kernel sub-circuits, probabilities of |1⟩ state of $1^{st}$ qubits of each quantum convolution kernel sub-circuit are computed to be $p_1$, $p_2$, $p_3$, $p_4$ respectively and used as convolution results. Assuming that the image category includes three categories: a cat, a dog and a frog, the classical neural network is a fully connected network, and the weights of neurons are:

the weights of the cat, the dog and the frog corresponding to the first sub-circuit are $W_{11}$, $W_{12}$, and $W_{13}$;

the weights of the cat, the dog and the frog corresponding to the second sub-circuit are $W_{21}$, $W_{22}$, and $W_{23}$;

the weights of the cat, the dog and the frog corresponding to the third sub-circuit are $W_{31}$, $W_{32}$, $W_{33}$;

the weights of the cat, the dog and the frog corresponding to the fourth sub-circuit are $W_{41}$, $W_{42}$, $W_{43}$;

the recognition probability corresponding to each image category is computed as:

probability of recognizing the image as the cat: $p_1*w_{11}+p_2*w_{21}+p_3*w_{31}+p_4*w_{41}$;

probability of recognizing the image as the dog: $p_1*w_{12}+p_2*w_{22}+p_3*w_{32}+p_4*w_{42}$;

probability of recognizing the image as the frog: $p_1*w_{12}+p_2*w_{22}+p_3*w_{32}+p_4*w_{42}$;

Finally, the image category with the highest recognition probability can be output as the recognition result of the target image data. Or, multiple or even all probabilities and their corresponding image categories can be output in sequence, which are sorted by probability and serve as the recognition result of the target image data. For example, the recognition result is:

cat: 87%; dog: 11%; frog: 2%.

In practical applications, through the measurement of the relevant bits of the quantum convolution neural network and the classical neural network, it is possible to output the computed recognition result, compare the recognition result with the real result to build a loss function, and iteratively update the gradient of the tunable parameters in the quantum convolution neural network through the loss function, thereby completing the training of the quantum convolution neural network.

For classification problems of image recognition, the cross-entropy loss function can be used, and the formula is as follows:

$$L(p,q)=-\Sigma_{i=1}^{n} p(y_i)\log(q(y_i))$$

Wherein, n is the number of image categories, $y_i$ represents the ith image category, for example, $y_1$, $y_2$, $y_3$ represents the cat, the dog and the frog, $p(y_i)$ represents the true label probability distribution of categorical data, and $q(y_i)$ represents the predicted label probability distribution of categorical data.

The gradient of the tunable parameter can be computed as follows:

$$\nabla_{\theta_i} f(x; \theta_i) = \frac{1}{2}\left[f\left(x; \theta_i + \frac{\pi}{2}\right) - f\left(x; \theta_i - \frac{\pi}{2}\right)\right]$$

Wherein, $f(x; \theta_i)$ can be understood as the quantum convolution function corresponding to the quantum convolution neural network, specifically the probability value measured by the quantum convolution neural network when the current input is x (pixel value) and $\theta_i$ (tunable parameter), x is the input pixel value, and $\theta_i$ is the current tunable parameter of the quantum logic gate, and $\nabla_{\theta_i}$ is the gradient.

The tunable parameter can be updated as follows:

$$\theta_i \leftarrow \theta_i - \eta \nabla_{\theta_i} L$$

Wherein, $\eta$ is the learning rate, the value of which is determined mainly based on the iterative convergence of the network, e.g., 1e-3. If it does not converge or converges too fast, for example, if it has converged after 3 rounds of training, it means that the value is too large, which requires a relative reduction of its value; if the convergence is slow, for example, after 30 rounds of training, it still has not converged, which means that the value is too small and needs to be adjusted relatively large.

S2305, displaying the recognition result of the target image in a second area.

Exemplarily, it is possible to display the category label of the image and its corresponding probability information in the second area of the terminal interface, and there are no restrictions on the display form. For the set multi-classification image categories, the recognition result is limited to these image categories; or it can be understood that the trained quantum convolution neural network is used for multi-classification based on the set image categories.

It can be seen that by receiving an input operation of a user for a target image; displaying the target image in a first area in response to the input operation; receiving a recognition operation of a user for the target image; in response to the recognition operation, recognizing the target image with a pre-trained quantum convolution neural network for recognizing image, and outputting a recognition result of the target image; wherein the quantum convolution neural network is constructed by a quantum circuit containing tunable parameters; displaying the recognition result of the target image in a second area, it is possible to realize the application of quantum computing in the field of convolutional neural network, so as to take advantage of the parallelism of quantum computing and to complement gaps in related technologies.

Figure 26:
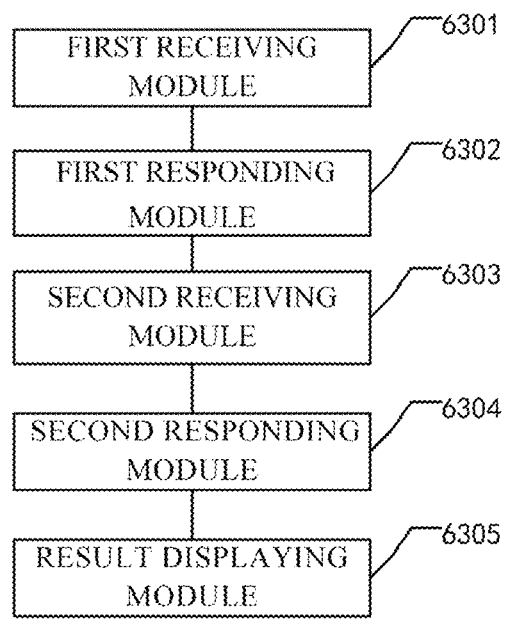
FIG. 26 is a structural schematic diagram of a display device for quantum image recognition provided by an embodiment of the present disclosure.

Referring to FIG. 26, FIG. 26 is a structural schematic diagram of a display device for quantum image recognition provided by an embodiment of the present disclosure, which corresponds to the process shown in FIG. 16, and the device comprises:

a first receiving module 6301 configured to receive an input operation of a user for a target image;

a first responding module 6302 configured to display the target image in a first area in response to the input operation;

a second receiving module 6303 configured to receive a recognition operation of a user for the target image;

a second responding module 6304 configured to, in response to the recognition operation, recognize the target image with a pre-trained quantum convolution neural network for recognizing image, and output a recognition result of the target image; wherein the quantum convolution neural network is constructed by a quantum circuit containing tunable parameters;

a result displaying module 6305 configured to display the recognition result of the target image in a second area.

Specifically, the target image comprises: grayscale image data or color image data.

Specifically, the second responding module comprises:

an inputting-operating unit configured to input the target image into a pre-trained one-layer or multi-layer quantum convolution neural network for quantum convolution operation, operate the quantum convolution neural network, and obtain and measure a quantum state carrying feature information of the target image;

a result outputting unit configured to input a measured result of the quantum state into the pre-selected trained classical neural network, and output a recognition result of the target image.

Specifically, the quantum convolution neural network comprises: a quantum state encoding sub-circuit, a quantum entanglement sub-circuit and a quantum convolution kernel sub-circuit; wherein, the quantum state encoding sub circuit is configured to encode pixel information of the target image onto a quantum state;

the quantum entanglement sub-circuit is configured to associate quantum state information of different qubits;

the quantum convolution kernel sub-circuit is configured to extract the feature information corresponding to the pixels carried by quantum state information.

Specifically, the inputting-operating unit is specifically configured for:

determining a parameter value to be input of a quantum logic gate in the quantum state encoding sub-circuit according to the pixel information of the target image;

inputting the parameter value to be input into the quantum state encoding sub-circuit.

Specifically, the inputting-operating unit is specifically configured for:

operating the quantum state encoding sub-circuit, the quantum entanglement sub-circuit, and the quantum convolution kernel sub-circuit successively under the condition that one-layer or multi-layer quantum convolution neural network is one layer;

measuring a preset qubits in the quantum convolution kernel sub-circuit so as to obtain the measured individual quantum states and their probabilities to be used as the measured result of the quantum convolution neural network;

operating each layer of quantum convolution neural network successively under the condition that one-layer or multi-layer quantum convolution neural network is multi-layer, measuring the preset qubits in the quantum convolution kernel sub-circuit in each layer of quantum convolution neural network until obtaining the measured result of last layer of quantum convolution neural network, wherein the next layer of quantum convolution neural network is input depending on the measured result of the previous layer of quantum convolution neural network.

Specifically, the result outputting unit is specifically configured for:

computing the convolution result of the target image according to the measured result of the quantum convolution neural network;

inputting the convolution result into the pre-selected trained classical neural network, and computing a probability corresponding to each image category according to weights of neurons in the classical neural network;

outputting the recognition result of the target image according to the probability corresponding to each image category.

It can be seen that by receiving an input operation of a user for a target image; displaying the target image in a first area in response to the input operation; receiving a recognition operation of a user for the target image; in response to the recognition operation, recognizing the target image with a pre-trained quantum convolution neural network for recognizing image, and outputting a recognition result of the target image; wherein the quantum convolution neural network is constructed by a quantum circuit containing tunable parameters; displaying the recognition result of the target image in a second area, it is possible to realize the application of quantum computing in the field of convolutional neural network, so as to take advantage of the parallelism of quantum computing and to complement gaps in related technologies.

An embodiment of the present disclosure further provides a storage medium in which a computer program is stored, wherein the computer program is set to execute the steps of any one of the above method embodiments at runtime.

Specifically, in the present embodiment, the storage medium may be set to store a computer program for performing the following steps:

S31, receiving an input operation of a user for a target image;

S32, displaying the target image in a first area in response to the input operation;

S33, receiving a recognition operation of a user for the target image;

S34, in response to the recognition operation, recognizing the target image with a pre-trained quantum convolution neural network for recognizing image, and outputting a recognition result of the target image; wherein the quantum convolution neural network is constructed by a quantum circuit containing tunable parameters;

S35, displaying the recognition result of the target image in a second area.

Specifically, in the present embodiment, the above storage media may include, but are not limited to: U disk, read-only memory (ROM), random access memory (RAM), portable hard disk, disk or optical disc and other media that can store computer programs.

An embodiment of the present disclosure further provides an electronic device comprising a memory and a processor, the memory is stored with a computer program therein, and the processor is set to run the computer program to execute the steps of any one of the above method embodiments.

Specifically, the above electronic device may further comprise a transmission device and an input-output device, wherein the transmission device is connected to the above processor, and the input-output device is connected to the above processor.

Specifically, in the present embodiment, the above processor may be set to perform the following steps by a computer program:

S31, receiving an input operation of a user for a target image;

S32, displaying the target image in a first area in response to the input operation;

S33, receiving a recognition operation of a user for the target image;

S34, in response to the recognition operation, recognizing the target image with a pre-trained quantum convolution neural network for recognizing image, and outputting a recognition result of the target image; wherein the quantum convolution neural network is constructed by a quantum circuit containing tunable parameters;

S35, displaying the recognition result of the target image in a second area.

An embodiment of the present disclosure further provides an image recognition method based on quantum classical hybrid neural network, which can be applied to an electronic device, such as a computer terminal, specifically, an ordinary computer, a quantum computer, etc.

Figure 27:
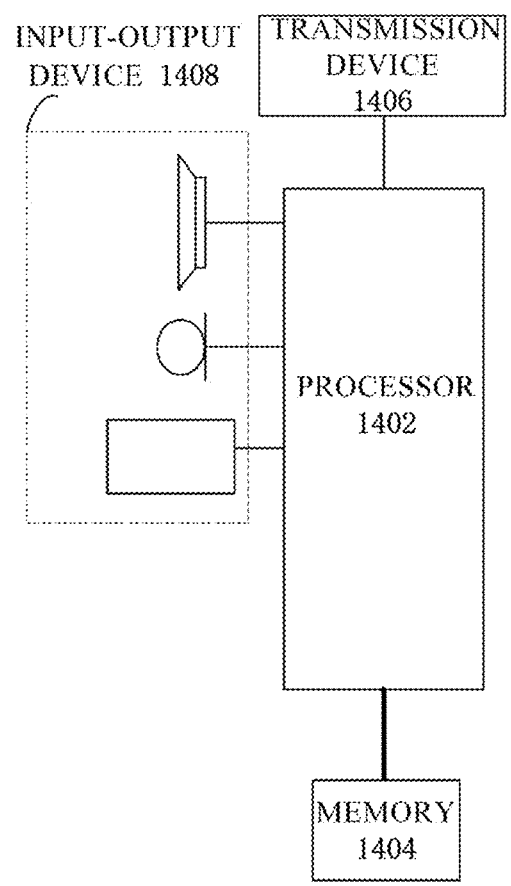
FIG. 27 is a structural block diagram of hardware of hardware of a computer terminal based on an image recognition method based on quantum classical hybrid neural network provided by an embodiment of the present disclosure.

It will be described in detail below by taking running on a computer terminal as an example. FIG. 27 is a structural block diagram of hardware of a computer terminal of an image recognition method based on quantum classical hybrid neural network provided by an embodiment of the present disclosure. As shown in FIG. 27, the computer terminal may include one or more (only one is shown in FIG. 27) processors 1402 (the processors 1402 may include, but are not limited to, a processing device such as a microprocessor MCU or a programmable logic device FPGA) and a memory 1404 for storing data. Optionally, the above computer terminal may further include a transmission device 1406 and an input-output device 1408 for a communication function. Those skilled in the art can understand that the structure shown in FIG. 27 is only schematic, and does not limit the structure of the computer terminal. For example, the computer terminal may also include more or fewer components than shown in FIG. 27, or have a different configuration than shown in FIG. 27.

The memory 1404 may be used to store a software program as well as a module for application software, such as program instructions/modules corresponding to the image recognition method based on quantum classical hybrid neural network in embodiments of the present disclosure. The processor 1402 executes various functional applications as well as data processing, i.e., implements the above-described method, by running the software program as well as the module stored in the memory 1404. The memory 1404 may include a high-speed random memory, and may also include a non-volatile memory, such as one or more magnetic storage devices, flash memory, or other non-volatile solid-state memory. In some examples, the memory 1404 may further include memories set remotely relative to the processor 1402, and these remote memories may be connected to the computer terminal via a network. An example of the network includes, but is not limited to, the Internet, an enterprise intranet, a local area network, a mobile communication network, and combinations thereof.

The transmission device 1406 is used to receive or send data via a network. A specific example of the above network may include a wireless network provided by a communications provider of a computer terminal. In one example, the transmission device 1406 includes a Network Interface Controller (NIC) that may be connected to other network devices via a base station so that it may communicate with the Internet. In one example, the transmission device 1406 may be a Radio Frequency (RF) module for communicating wirelessly with the Internet.

It should be noted that a real quantum computer is hybrid in structure and consists of two main parts: a classical computer, which is responsible for performing classical computation and control, and a quantum device, which is responsible for running a quantum program and thus realizing quantum computation. The quantum program is a sequence of instructions written in a quantum language, such as QRunes, that can be run on the quantum computer, which enables support for a quantum logic gate operation and ultimately quantum computation. Specifically, the quantum program is a sequence of instructions that operates the quantum logic gate in a certain time sequence.

In practical applications, due to the development of hardware of quantum devices, quantum computing simulations are often required to verify quantum algorithms, quantum applications, and so on. Quantum computing simulation refers to the process of using the virtual architecture (that is, quantum virtual machine) built with the resources of ordinary computers to realize the simulation operation of quantum programs corresponding to specific problems. Often, it is necessary to construct quantum programs corresponding to specific problems. The quantum program referred to in the embodiment of the present disclosure is a program written in a classical language characterizing qubits and their evolution, wherein qubits, quantum logic gates, etc. related to quantum computing are represented by corresponding classical codes.

The quantum circuit, as an embodiment of a quantum program, is also known as a quantum logic circuit, is the most commonly used general-purpose quantum computation model, represents a circuit that operates on a qubit in an abstract concept, consists of a qubit, a circuit (a timeline), and a variety of quantum logic gates, and is often required to read out the results of the final quantum measurement operation.

Unlike a conventional circuit where metal wires are connected to transmit a voltage or current signal, in the quantum circuit, the circuit can be viewed as connected by time, i.e., the state of the qubit evolves naturally over time following the instructions of the Hamiltonian operator, until it encounters a logic gate and is operated.

A quantum program as a whole corresponds to a total quantum circuit. The quantum program in this disclosure refers to the total quantum circuit, wherein the total number of qubits in the total quantum circuit is the same as the total number of qubits in the quantum program. It can be understood that a quantum program can be composed of a quantum circuit, measurement operations for the qubits in the quantum circuit, a register for storing the measurement results, and a control flow node (jump instruction). A quantum circuit can contain tens, hundreds or even thousands of quantum logic gate operations. The process of executing a quantum program is the process of executing all quantum logic gates according to a certain time sequence. It should be noted that time sequence is the time sequence in which a single quantum logic gate is executed.

It should be noted that in classical computing, the most basic unit is a bit, and the most basic control mode is a logic gate. The purpose of controlling the circuit can be achieved through the combination of logic gates. Similarly, the way to handle qubits is quantum logic gates. Quantum states can be evolved using quantum logic gates. Quantum logic gates are the basis of quantum circuits, and quantum logic gates include single-bit quantum logic gates, such as Hadamard gate (H gate, Hadamard gate), Pauli-X gate (X gate), Pauli-Y gate (Y gate), Pauli-Z gate (Z gate), RX gate, RY gate, RZ gate, etc.; a double-bit or multi-bit quantum logic gate, such as CNOT gate, CR gate, CZ gate, iSWAP gate, Toffoli gate, etc. Quantum logic gates are generally represented by unitary matrices, and unitary matrices are not only in the form of matrices, but also a kind of operation and transformation. Generally, the function of a quantum logic gate on a quantum state is computed by multiplying the left side of the unitary matrix by the matrix corresponding to the right vector of the quantum state.

Figure 28:
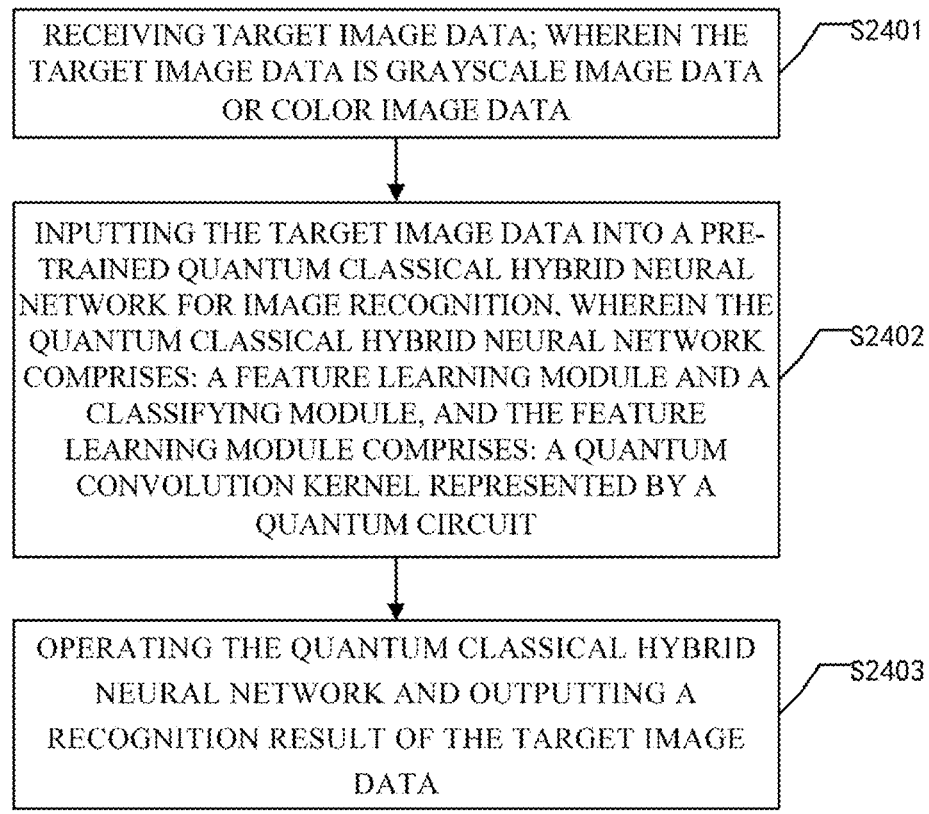
FIG. 28 is a schematic flowchart of an image recognition method based on quantum classical hybrid neural network provided by an embodiment of the present disclosure.

Referring to FIG. 28, FIG. 28 is a schematic flowchart of an image recognition method based on quantum classical hybrid neural network provided by an embodiment of the present disclosure, which comprises the following steps:

S2401, receiving target image data; wherein the target image data is grayscale image data or color image data;

Specifically, there is no limitation on the form and content of the image, including text images, etc.

For example, the received image data is a grayscale image with one channel count, and is represented by a tensor matrix with a data dimension size of a four-dimensional, and the numeric range is a floating-point number between 0 and 1. Assuming that the number of images received is one page of grayscale image with a size of 28*28 and one channel, it has a total of 1*1*28*28=784 pixels; alternatively, assuming that the incoming image data is ten pages of color image with three channels and the image size is 32*32, then there are a total of 10*3*32*32=30720 pixels.

S2402, inputting the target image data into a pre-trained quantum classical hybrid neural network for image recognition, wherein the quantum classical hybrid neural network comprises: a feature learning module and a classifying module, and the feature learning module comprises: a quantum convolution kernel represented by a quantum circuit;

Specifically, the quantum classical hybrid neural network refers to a hybrid neural network involving quantum computation and classical computation. In addition, the quantum circuit may include an encoding sub-circuit for pixel value encoding and one or more training sub-circuits for training, and the feature learning module may further include a pooling layer.

Wherein, one quantum circuit corresponds to one quantum convolution kernel, and one quantum convolution kernel scans the target image to extract a feature. In practical applications, a plurality of quantum circuits can be set to correspond to a plurality of quantum convolution kernels, so as to extract a plurality of features of the target image and form a plurality of feature maps for more accurately identifying the image.

Specifically, the encoding sub-circuit may include a first parameter-containing quantum logic gate which includes a first tunable parameter, and the number of qubits of the encoding sub-circuit is the number of a group of pixel values in the target image data to be input.

Wherein, the parameter-containing quantum logic gate refers to a quantum logic gate in which the unitary matrix contains a tunable parameter. The first parameter-containing quantum logic gate in the encoding sub-circuit can be a rotating logic gate, such as one or more combinations of RX gates, RY gates, and RZ gates, and the order of the logic gate is not limited, and it specifically includes: RX gates; RY gates; RZ gates; RX gates and RY gates; RX gates and RZ gates; RY gates and RZ gates; RX gates, RY gates and RZ gates. To be clear, the logic gates set on each qubit in the encoding sub-circuit are the same.

In practical applications, the quantum convolution kernel scans a group of pixel values in the target image data at a time, i.e., the quantum circuit receives an input of a group of pixel values at a time. During the next scanning, the scanning position corresponding to the current group of pixel values may be shifted to the right by one or more steps, and the next group of pixel values after the right shift is scanned, so as to input the next group of pixel values.

Specifically, for each group of pixel values of the target image data, it is possible to compute the first tunable parameter value of the first tunable parameter corresponding to the group of pixel values, and inputting the first tunable parameter value into the first parameter-containing quantum logic gate.

Wherein, the first tunable parameter value can be: the arctangent value of the corresponding attribute value or the arctangent value of the square of the attribute value, or it can be computed by a preset formula, e.g., first tunable parameter value=attribute value*π/2 and so on.

Exemplarily, a group of pixel values are 4 pixel values $x_1$, $x_2$, $x_3$, $x_4$, and the encoding sub-circuit includes 4 qubits, and the first parameter-containing quantum logic gate on each of the qubits is RY gate. The first tunable parameter values in the 4 RY gates are computed, and are respectively: $\theta_1 = x_1 * \pi/2$, $\theta_2 = x_2 * \pi/2$, $\theta_3 = x_3 * \pi/2$, $\theta_4 = x_4 * \pi/2$.

Exemplarily, a group of pixel values are 4 pixel values $x_1$, $x_2$, $x_3$, $x_4$, and the encoding sub-circuit includes 4 qubits, and the first parameter-containing quantum logic gate on each of the qubits is a combination of RY gate and RZ gate. The first tunable parameter values in the 4 RY gates are computed, and are arctangent values arctan $x_1$, arctan $x_2$, arctan $x_3$, arctan $x_4$ of the corresponding pixel values respectively; the first tunable parameter values in the 4 RZ gates are computed, and are arctangent values arctan $x_1^2$, arctan $x_2^2$, arctan $x_3^2$, arctan $x_4^2$ of the square of the corresponding pixel values.

Specifically, the training sub-circuit includes a second parameter-containing quantum logic gate, which acts on a single qubit, such as an RY gate, etc.; further includes a preset quantum logic gate without a tunable parameter, which act on two qubits, such as CNOT gates acting on two adjacent bits, etc. The second parameter-containing quantum logic gate contains the second tunable parameter determined by training. Moreover, the number of qubits of the training sub-circuit is the same as the number of qubits of the encoding sub-circuit module, and they are both the number of pixel values of the group. The number of the training sub-circuit can be set according to the actual application need of convolution operation (serial setting, that is, the quantum circuit includes in sequence: an encoding sub-circuit, a training sub-circuit 1, a training sub-circuit 2, . . . ).

S2403, operating the quantum classical hybrid neural network and outputting a recognition result of the target image data.

Wherein, the classifying module may include a fully connected layer (Fully-Connected). Specifically, it is possible to perform convolution operation on each group of pixel values through the quantum convolution kernel, and output the convolved first feature map; to perform a pooling operation on the first feature map through the pooling layer and output a pooled second feature map; to classify the second feature map through the fully connected layer, and output a classification result as a recognition result of the target image data.

Specifically, it is possible to operate the quantum circuit, measure the quantum circuit, and determine the convolution result of each group of pixel values according to the measured result, and the convolution result of each group of pixel values constitutes a first feature map.

Specifically, it is possible to measure all qubits of the quantum circuit to obtain each quantum state and their amplitudes of all the qubits; to compute the probability corresponding to the amplitude, and compute convolution results of each group of pixel values according to each quantum state and the probability thereof.

In one implementation, it is possible to compute convolution results of each group of pixel values according to the number of the preset substrates in each quantum state and the corresponding probability thereof. For example, the measured result of a 2-qubits is:

|00⟩ state, probability P0; state, probability P1; state, probability P2; state, probability P3. The convolution result is computed as:

$$P_0 * (-1)^{n_0} + P_1 * (-1)^{n_1} + P_2 * (-1)^{n_2} + P_3 * (-1)^{n_3}$$

Wherein, are the number of a preset sub-state in state, state, state, and state, that is, $n_0=0$、$n_1=1$、$n_2=1$、$n_3=2$, therefore obtaining the convolution result:

$$P_0 - P_1 - P_2 + P_3$$

In one implementation, it is possible to accumulate the product of the decimal value (for example, the state corresponds to the decimal value 3) corresponding to each quantum state and the probability, and determine the accumulated sum as the convolution result of each group of pixel values.

In practical applications, measuring the quantum circuit and determining the convolution result of each group of pixel values according to the measured result, or measuring a preset bit of qubit in the quantum circuit, so as to obtain the quantum states of the preset bit of qubit and amplitudes thereof; computing the probability corresponding to the amplitude of the preset quantum state in each quantum state as the convolution result of the group of pixel values. For example, the preset bit of qubit may be 1st qubit, and the preset quantum state may be state of 1st qubit, and so on.

The convolution result value is then obtained from each set of pixel values through the quantum circuit and arranged accordingly to form the first feature map, the number of which is the same as the number of quantum circuits. After the first feature map is pooled and fully connected, the image category with the highest recognition probability can be output as the recognition result of the target image data. Or, multiple or even all probabilities and their corresponding image categories can be output in sequence, which are sorted by probability and serve as the recognition result of the target image data. For example, assuming that the image category includes three categories: a cat, a dog and a frog, the outputted recognition result may be: cat: 87%; dog: 11%; frog: 2%.

After the first convolution and pooling, multiple iterations of convolution and pooling can be continued to improve the accuracy of target image recognition. Wherein, pooling and fully connected are prior arts. When the fully connected layer operation is performed, the pooled second feature map is first flattened, and then the corresponding neurons and weights are computed, which will not repeated by the present disclosure herein.

In practical applications, it is possible to compare the recognition result with the real result to build a loss function, and iteratively update the gradient of the second tunable parameter of the quantum convolution kernel through the loss function, thereby completing the training of the quantum classical hybrid neural network.

For classification problems of image recognition, the cross-entropy loss function can be used, and the formula is as follows:

$$L(p,q) = -\Sigma_{i=1}^{n} p(y_i) \log(q(y_i))$$

Wherein, n is the number of image categories, yi represents the ith image category, for example, y1, y2, y3 represents the cat, the dog and the frog, p(yi) represents the true label probability distribution of categorical data, and q(yi) represents the predicted label probability distribution of categorical data.

The gradient of the tunable parameter can be computed as follows:

$$\nabla_{\theta_i} f(x; \theta_i) = \frac{1}{2}\left[f\left(x; \theta_i + \frac{\pi}{2}\right) - f\left(x; \theta_i - \frac{\pi}{2}\right)\right]$$

Wherein, $f(x; \theta_i)$ can be understood as the quantum convolution function corresponding to the quantum convolution neural network, specifically the probability value measured by the quantum convolution neural network when the current input is x (pixel value) and $\theta_i$ (second tunable parameter), x is the input pixel value, and $\theta_i$ is the current second tunable parameter of the quantum logic gate, and $\nabla_{\theta_i}$ is the gradient.

The second tunable parameter can be updated as follows:

$$\theta_i \leftarrow \theta_i - \eta \nabla_{\theta_i} L$$

Wherein, η is the learning rate, the value of which is determined mainly based on the iterative convergence of the network, e.g., 1e-3. If it does not converge or converges too fast, for example, if it has converged after 3 rounds of training, it means that the value is too large, which requires a relative reduction of its value; if the convergence is slow, for example, after 30 rounds of training, it still has not converged, which means that the value is too small and needs to be adjusted relatively large.

It can be seen that by receiving target image data, inputting the target image data into a pre-trained quantum classical hybrid neural network for image recognition, operating the quantum classical hybrid neural network and outputting a recognition result of the target image data, it is possible to realize the application of quantum computing in the field of convolutional neural network, so as to take advantage of the parallelism of quantum computing and to complement gaps in related technologies.

Figure 29:
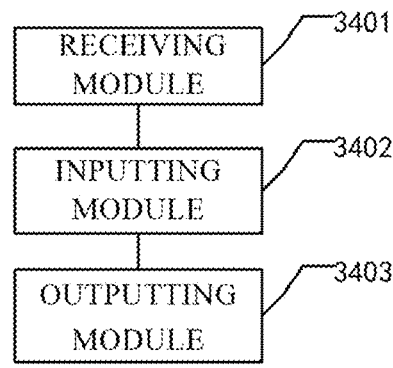
FIG. 29 is a structural schematic diagram of an image recognition device based on quantum classical hybrid neural network provided by an embodiment of the present disclosure.

FIG. 29, FIG. 29 is a structural schematic diagram of an image recognition device based on quantum classical hybrid neural network provided by an embodiment of the present disclosure, which comprises:

a receiving module 3401 configured to receive target image data; wherein the target image data is grayscale image data or color image data;

an inputting module 3402 configured to input the target image data into a pre-trained quantum classical hybrid neural network for image recognition, wherein the quantum classical hybrid neural network comprises: a feature learning module and a classifying module, and the feature learning module comprises: a quantum convolution kernel represented by a quantum circuit;

an outputting module 3403 configured to operate the quantum classical hybrid neural network and outputting a recognition result of the target image data.

Specifically, the quantum circuit comprises: an encoding sub-circuit for pixel value encoding, one or more training sub-circuits for training, and the feature learning module further comprises: a pooling layer.

Specifically, the encoding sub-circuit comprises a first parameter-containing quantum logic gate, and the first parameter-containing quantum logic gate comprises a first tunable parameter;

The inputting module is specifically configured for:

for each group of pixel values of the target image data, computing a first tunable parameter value of the first tunable parameter corresponding to the group of pixel values;

inputting the first tunable parameter value into the first parameter-containing quantum logic gate.

Specifically, the training sub comprises a second tunable parameter for use in a trained second parameter containing quantum logic gate, and the number of qubits of the training sub-circuit is the same as that of the encoding sub-circuit, and both are the number of a group of pixel values.

Specifically, the classifying module comprises: a fully connected layer;

The outputting module comprises:

a convolution unit configured to perform convolution operation on each group of pixel values through the quantum convolution kernel, and outputting a convolved first feature map;

a pooling unit configured to perform pooling operation on the first feature map through the pooling layer, and outputting a pooled second feature map;

a classifying unit configured to classify the second feature map through the fully connected layer, and outputting a classification result as a recognition result of the target image data.

Specifically, the convolution unit comprises:

a measuring sub-unit configured to operate the quantum circuit, measuring the quantum circuit, and determining the convolution result of each group of pixel values according to the measured result, and the convolution result constitutes a first feature map.

Specifically, the measuring sub-unit is specifically configured for:

measuring all qubits of the quantum circuit to obtain each quantum state and their amplitudes of all the qubits;

computing the probability corresponding to the amplitude, and computing convolution results of each group of pixel values according to the number of the preset substrates in each quantum state and the corresponding probability thereof.

It can be seen that by receiving target image data, inputting the target image data into a pre-trained quantum classical hybrid neural network for image recognition, operating the quantum classical hybrid neural network and outputting a recognition result of the target image data, it is possible to realize the application of quantum computing in the field of convolutional neural network, so as to take advantage of the parallelism of quantum computing and to complement gaps in related technologies.

An embodiment of the present disclosure further provides a storage medium in which a computer program is stored, wherein the computer program is set to execute the steps of any one of the above method embodiments at runtime.

Specifically, in the present embodiment, the storage medium may be set to store a computer program for performing the following steps:

S41, receiving target image data; wherein the target image data is grayscale image data or color image data;

S42, inputting the target image data into a pre-trained quantum classical hybrid neural network for image recognition, wherein the quantum classical hybrid neural network comprises: a feature learning module and a classifying module, and the feature learning module comprises: a quantum convolution kernel represented by a quantum circuit;

S43, operating the quantum classical hybrid neural network and outputting a recognition result of the target image data.

Specifically, in the present embodiment, the above storage media may include, but are not limited to: U disk, read-only memory (ROM), random access memory (RAM), portable hard disk, disk or optical disc and other media that can store computer programs.

An embodiment of the present disclosure further provides an electronic device comprising a memory and a processor, the memory is stored with a computer program therein, and the processor is set to run the computer program to execute the steps of any one of the above method embodiments.

Specifically, the above electronic device may further comprise a transmission device and an input-output device, wherein the transmission device is connected to the above processor, and the input-output device is connected to the above processor.

Specifically, in the present embodiment, the above processor may be set to perform the following steps by a computer program:

S41, receiving target image data; wherein the target image data is grayscale image data or color image data;

S42, inputting the target image data into a pre-trained quantum classical hybrid neural network for image recognition, wherein the quantum classical hybrid neural network comprises: a feature learning module and a classifying module, and the feature learning module comprises: a quantum convolution kernel represented by a quantum circuit;

S43, operating the quantum classical hybrid neural network and outputting a recognition result of the target image data.

The above embodiments shown in accordance with the schemas detail the structure, characteristics, and effects of the present disclosure, and the above is only a preferred embodiment of the present disclosure, but the present disclosure does not limit the scope of embodiment as shown in the accompanying drawings. Any alteration made in accordance with the conception of the present disclosure, or modified to an equivalent embodiment of the change, shall be within the scope of protection of the present disclosure if it is not beyond the spirit covered by the description and accompanying drawings.

The invention claimed is:

1. A quantum computer, comprising:

a processor; and a memory having computer program stored thereon, wherein the computer program, when being run by the processor, implements a quantum convolution operator; wherein the quantum convolution operator comprises: a quantum state encoding module, a quantum entanglement module, a quantum convolution kernel module, a measuring module, and a computing module; wherein the quantum state encoding module is configured to encode a current group of input data onto qubits;

the quantum entanglement module comprises CNOT gates acting on two adjacent qubits, and is configured to associate quantum state information of different qubits via the CNOT gates;

the quantum convolution kernel module is configured to extract feature information corresponding to the quantum state information;

the measuring module is configured to measure a quantum state of a preset qubit and obtain a corresponding amplitude; and the computing module is configured to compute a convolution result corresponding to the current group of input data according to the measured quantum state and its amplitude;

wherein the quantum convolution kernel module comprises a U3 gate of a quantum logic gate, wherein a unitary matrix of the U3 gate is:

$$R(\alpha, \beta, \gamma) = \begin{bmatrix} \cos\left(\frac{\alpha}{2}\right) & -e^{i\gamma} \times \sin\left(\frac{\alpha}{2}\right) \\ e^{i\beta} \times \sin\left(\frac{\alpha}{2}\right) & e^{i\gamma+i\beta} \times \cos\left(\frac{\alpha}{2}\right) \end{bmatrix}$$

wherein $\alpha$, $\beta$, and $\gamma$ are angular variables.

2. The quantum computer of claim 1, wherein the quantum state encoding module comprises quantum logic gates; and said "encode the current group of input data onto qubits", comprises:

determining a variable parameter value in a quantum logic gate corresponding to the current group of input data, wherein the quantum logic gate supports dynamic modification of the variable parameter value.

3. The quantum computer of claim 1, wherein the quantum convolution operator further comprises:

an updating module, configured to update a parameter value of a quantum state encoding module corresponding to the next group of input data according to a preset mapping relationship.

4. The quantum computer of claim 3, wherein said "update a parameter value of a quantum state encoding module corresponding to the next group of input data according to a preset mapping relationship", comprises:

according to a preset mapping relationship between the input data and quantum state encoding circuits of the quantum state encoding module, updating a quantum state encoding circuit corresponding to the next group of input data so as to obtain a new quantum state encoding circuit as an updated quantum state encoding module.

5. The quantum computer of claim 1, wherein said "compute a convolution result corresponding to the input data according to the measured quantum state and its amplitude", comprises:

according to the measured quantum state and its amplitude, computing a probability corresponding to when the preset qubit is in a preset quantum state as a convolution result corresponding to the current group of input data.

6. The quantum computer of claim 1, wherein in the case where the quantum entanglement module and/or the quantum convolution kernel module comprises a quantum logic gate, a variable parameter value in the quantum logic gate is determined by pre-training.

7. The quantum computer of claim 1, wherein the input data comprises: an image, natural language, or audio data.

8. The quantum computer of claim 1, wherein the quantum state comprises a following quantum logic gate: an RX gate, an RY gate, an RZ gate, or an X gate.

9. The quantum computer of claim 1, wherein the last CNOT gate acts on the last qubit and the first qubit.

* * * * *